(12) United States Patent
Goodkovsky

(10) Patent No.: US 6,807,535 B2
(45) Date of Patent: Oct. 19, 2004

(54) INTELLIGENT TUTORING SYSTEM

(75) Inventor: Vladimir A. Goodkovsky, Greenbelt, MD (US)

(73) Assignee: LNK Corporation, Riverdale, MD (US)

( * ) Notice: Subject to any disclaimer, the term of this patent is extended or adjusted under 35 U.S.C. 154(b) by 500 days.

(21) Appl. No.: 09/801,059

(22) Filed: Mar. 8, 2001

(65) Prior Publication Data

US 2002/0107681 A1 Aug. 8, 2002

Related U.S. Application Data

(60) Provisional application No. 60/187,865, filed on Mar. 8, 2000.

(51) Int. Cl.[7] .......................... G06G 7/00; G06F 15/18; G06F 17/00
(52) U.S. Cl. ....................... 706/3; 706/4; 706/5; 706/45
(58) Field of Search ............................. 706/3, 4, 5, 45

(56) References Cited

U.S. PATENT DOCUMENTS

| | | | |
|---|---|---|---|
| 4,622,013 A | 11/1986 | Cerchio | 434/118 |
| 4,847,784 A | 7/1989 | Clancey | 364/513 |
| 5,306,154 A | 4/1994 | Ujita et al. | 434/218 |
| 5,597,312 A | 1/1997 | Bloom et al. | 434/362 |
| 5,727,950 A | 3/1998 | Cook et al. | 434/350 |
| 5,727,951 A | 3/1998 | Ho et al. | 434/362 |
| 5,743,746 A | 4/1998 | Ho et al. | 434/332 |
| 5,779,486 A | 7/1998 | Ho et al. | 434/353 |
| 5,827,070 A | 10/1998 | Kershaw et al. | 434/322 |
| 5,841,655 A | 11/1998 | Stocking et al. | 364/188 |
| 5,863,208 A | 1/1999 | Ho et al. | 434/362 |
| 5,870,731 A | 2/1999 | Trif et al. | 706/52 |
| 5,904,485 A | 5/1999 | Siefert | 434/322 |
| 5,934,910 A | 8/1999 | Ho et al. | 434/362 |
| 6,032,141 A | * 2/2000 | O'Connor et al. | 706/45 |

OTHER PUBLICATIONS

Gwo-Jen Hwang, "A Knowledge-Based System as an Intelligent Learning Advisor on Computer Networks", Oct. 1999.*
IEEE International Conference on Systems, Man, and Cybernetics.*
Roger Nkambou, "Managing Inference Process in Student Modelling for Intelligent Tutoring Systems", Nov. 1999.*
IEEE International Conference on Tools with Artificial Intelligence.*

* cited by examiner

*Primary Examiner*—George B. Davis
(74) *Attorney, Agent, or Firm*—Crowell & Moring LLP

(57) ABSTRACT

A computer implemented method and apparatus for simulating an intelligent tutor for interactive adaptive training of learners in any domain includes a Domain Module, a Tutor Module and an Interface. Items to be learned, and their prerequisite and other dependency relationships are represented in a fuzzy graph, together with a fuzzy logic computational engine, which dynamically adapts the available sequence of training actions (such as presentations/explanations, simulations, exercises and tasks/questions) to a current assessment of the learner's knowledge skill, the level of difficulty of the presented material, and preferences and learning style of the individual learner. Fuzzy logic is used as the basis of arc weightings, and the computations, but the general methodology is applicable to other approaches to weighting in computation.

28 Claims, 14 Drawing Sheets

INTELLIGENT TUTORING SYSTEM

This application claims the priority of Provisional Patent Application Serial No. 60/187,865, filed Mar. 8, 2000, the disclosure of which is expressly incorporated by reference herein.

BACKGROUND OF THE INVENTION

A computer program listing is submitted in form of compact disk.

The present invention is directed to a computer implemented method and apparatus for simulating an intelligent tutor for interactive adaptive training of learners in any domain (that is, field of learning) under study.

Known computer-based training systems generally may be divided into two groups: classical Computer Based Training (CBT) and advanced Intelligent Tutoring Systems (ITS). Classical CBT systems are based on "manual" design of training "scripts", which predefine what the CBT system should to do in any learning situation for each learner. Because of the enormous number of possible situations and diversity of learners, it is practically impossible to design quality training systems by manual scripting.

Intelligent Tutoring Systems, on the other hand, include two opposite approaches: Case-Based and Model-Based training systems. Case-Based Training systems are learnable and can be trained by expert-tutors how to teach learners. In the training stage, they memorize the most effective actions of the tutor in current learning situations from examples (cases) given by designer (author). After that "training", in the implementation stage, such ITS can teach learners itself by taking the same teaching actions in the same and close situations by recalling the cases from memory. In practice learners encounter a large number of learning situations, so that the number of cases to train the system must be large as well. In contrast, short and affordable authoring can provide only very rough simulation of tutor's activity. Case-Based Training systems may be regarded as useful when applied complementary to the following model-based approach.

Model-Based Training systems need neither scripts to enter nor cases to learn. Rather, they are based directly on generalized tutoring knowledge and experience represented with models. Models can be represented in the form of empirical rules, decision tables, and theoretical relations. A part of these models can be reusable for different training paradigms/domains/learners. Reusability allows reducing the authoring labor. Examples are REDEEM, XAIDA, SIMQUEST, MOBIT.

Within Model-Based Training systems it is possible to distinguish empirical and theoretical modeling. Empirical model-based ITSs are designed usually by rule-based authoring. This is similar to rather high-level programming with production systems, which can be supported with some commercial tools for knowledge-based systems design. Such systems provide authors with capability to design and implement reusable rules and save their labor in this manner, but do not provide them with ready-made reusable models. See REDEEM, XAIDA, SIMQUEST.

Theoretical model-based ITSs are based on ready-made models that are specific for a training field and are generic within this field. These models comprise the best pedagogical experience materialized in a form of a reusable model-based Shell, which can be used by different authors to save on authoring for different training paradigms/domains/ learners. However, there are at present no ready-made theoretical models, shells and tools for theoretical model based ITS's. Accordingly, some authors have partially solved this problem using a bottom up approach, for example, providing authors with specific templates within which blanks can be filled in. However, no known system has heretofore used a top=down approach and imprecise tunable modeling, as achieved by the system according to the invention.

Prior art model-based intelligent training systems have included:

a Domain Module for presentation and/or simulation of domain under study;

an expert system for presentation of ideal task performing;

a learner model defining personal knowledge, skills, and traits for training individualization, an instructional or tutorial module defining objectives, strategy, style, and modes of training, and an interface for system interaction with learner and author.

These prior intelligent tutoring systems suffer, however, from a number of important deficiencies. First, they are empirical (not theoretical) model-based systems. Moreover, their tutorial module does not comprise a generic and reusable ITS Shell, so that authors need to re-design the ITS tutorial module for different training paradigms/domains/ learners from scratch Altogether this means a high cost of ITSs and an absence of their quality guarantee.

Accordingly, a primary goal of the present invention is to provide a reusable, training paradigms/domains/learners-independent, theoretical, actively adaptive, fuzzy, domain/ learner/tutor model-based Shell with checking/prognosis/ diagnosis-based dynamic planning capability.

Another object of the invention is to provide an ITS of the type described above, which, being filled in with concrete meta and media data by an author, can automatically realize intelligent, high quality, and efficient interactive adaptive training at low cost.

Yet another important objective of the invention is to provide a theoretical model based ITS on the basis of a top down approach and imprecise tunable modeling.

Additional objectives of the invention are:

to support learner-driven training;

to provide reuse of ready-made CBT, simulators, and games learning materials;

to supervise (control over) functioning of traditional ready-made CBT, simulators, games, and other training systems and applications;

to support plug in of existing web, CBT, simulation, game, and other applications authoring tools for learning/training content media design;

to support plug in of existing pre-authoring tools for job/task cognitive analysis;

to realize the system's self-improvement capability.

SUMMARY OF THE INVENTION

These and other objects and advantages are achieved by the intelligent tutoring system according to the invention which includes some of the same standard modules as other ITS's (Domain Module, Tutor Module, and interface) but with new properties, functions, structure, modes and in a new interrelation among them. In this regard, an important feature of the invention resides in the methodology used to structure and represent items to be learned and their prerequisite and other dependency relationships (in any subject domain for any category of learners, and on the basis of any training paradigm and theory) in a (fuzzy) graph, together with a (fuzzy logic) computational engine (learner model) which dynamically adapts the available sequence of training actions (such as presentations/explanations, simulations, exercises, tasks/questions) to a current assessment of the learner's knowledge/skills, the level of difficulty of the presented material, and preferences and learning style of the individual learner. According to the invention, fuzzy logic is used as the basis of arc weightings and the computations, but the general methodology is applicable to other approaches to weighting and computation. Details of the programming functionality for important features of the invention are set forth in Table I (including a glossary) at the conclusion of this specification, of which it is a part.

The Intelligent Tutoring Systems Shell and Authoring Tool according to the invention is implemented in the form of a computer program for the following purposes:

For easy design of cost-effective Intelligent Tutoring Systems by filling in training paradigm/domain/learner—specific data into blanks of training paradigm/domain/learner—generic system Shell;

For executing cost-effective adaptive training of learners tailored to individual learner's current knowledge/skills, difficulty level, control level, preferences, and learning style in accordance with training objectives, strategy, and style of training pre-defined by the author.

The main system properties are:

The system can deliver realistic domain content in interactive multimedia, simulation, VR media.

It can be used any time and in any place, through the Internet as well.

It is a mixed initiative system providing a learner with capability to learn on his own and to use instructional support of an embedded tutor when it is necessary to resolve learning problems and/or achieve learning objectives by the most effective way, The system provides a complete set of basic instructional modes: pre-test, instruction, practice, remediation, post-test.

The system makes learning/training logic transparent for learners by displaying the current assessment of learner's knowledge/skills mastery and corresponding system's training action.

High quality and effectiveness of training that can be expressed in terms of meeting objectives and learners' satisfaction in shortest time.

Low cost of system design, that can be expressed in terms of effort, time, and recourses of authors for course design and development.

Low cost of training that can be expressed in terms of consuming time and resource for achieving learning/training objectives.

The system simulates the best tutor that adapts to a learner.

The system pre-tests student to ensure that he/she is ready to learn the course unit selected.

The system dynamically plans and executes an individual training process in one-on-one interaction with learner.

The system gives to learner new knowledge/skills by providing him/her with necessary learning materials and/or domain situations for knowledge/skills construction.

The system realizes the optimal teaching strategy and style for the courseware available.

The system adapts to learner's personal knowledge, skills, preferences, and learning style.

The system can check learner's knowledge/skills tracking his/her progress and detecting errors.

The system assists learner by finding the causes of his/her errors and correcting them by appropriate re-training.

The system lets a learner control the pace and progress of his/her own learning.

The system post-tests a learner to make sure he/she successfully achieved the course or unit's training objectives.

The system supports the following author's operations:
(1) Login;
(2) Create a new course or open an existing course;
(3) Specification of a customer order for course design in terms of a target audience, particular domain, job/tasks, and training objectives;
(4) Pre-authoring session for an analysis of target audience, particular domain, job/tasks, and training objectives;
(5) Authoring session of the course synthesis (design and development) for target audience, particular domain, job/tasks, and training objectives;
(6) Course release, testing, and debugging;
(7) Implementation results analysis. Course correction.
(8) Close a course;
(9) Logout.

The system supports the following learner's operations:
Login;
Open course and unit;
Start unit
Learning/Training session;
Stop unit;
Close unit and course;
Logout.

Other objects, advantages and novel features of the present invention will become apparent from the following detailed description of the invention when considered in conjunction with the accompanying drawings.

BRIEF DESCRIPTION OF THE INVENTION

DETAILED DESCRIPTION OF THE INVENTION

Figure 1:
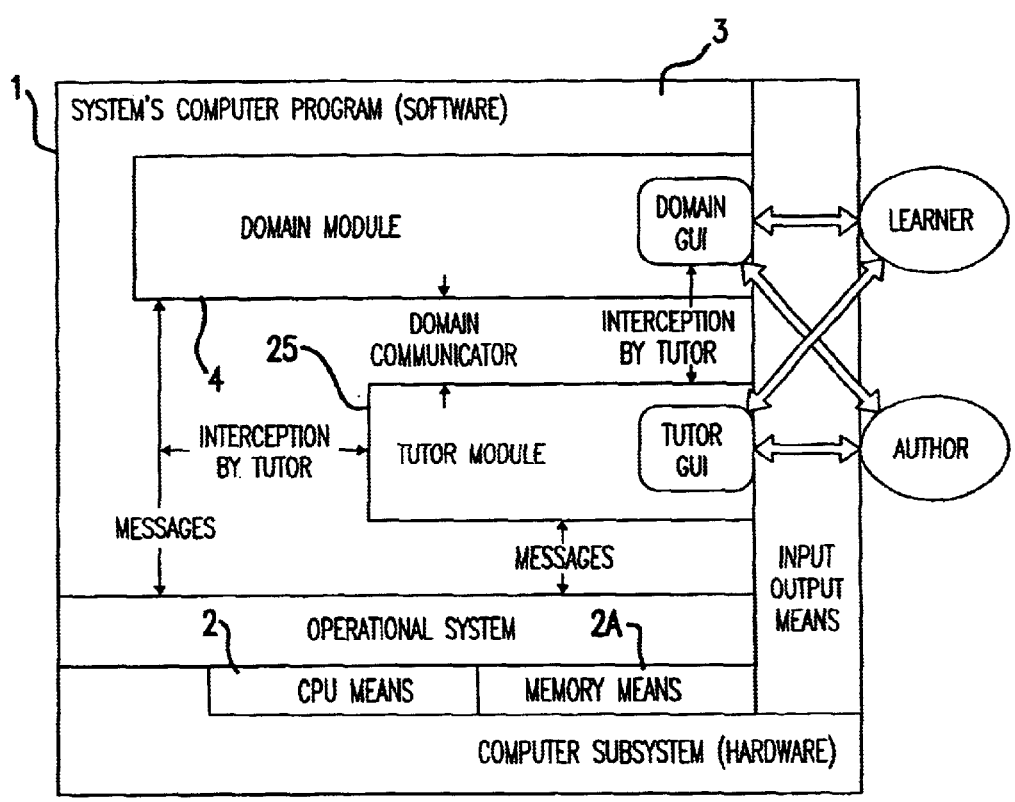
FIG. 1 is a conceptual diagram which illustrates the composition of the overall ITS according to the invention.

The system 1, which represents a computer program comprising a Domain Module and Tutor Module that interact with each other and with users (authors and learners), is illustrated in FIG. 1. It includes a CPU 2 (with memory 2A) operated by systems software 3, including a Domain Module 4 and a Tutor Module 25. Both of the latter modules include a graphic user interface (GUI) for communication with both authors and learners.

Figure 2:
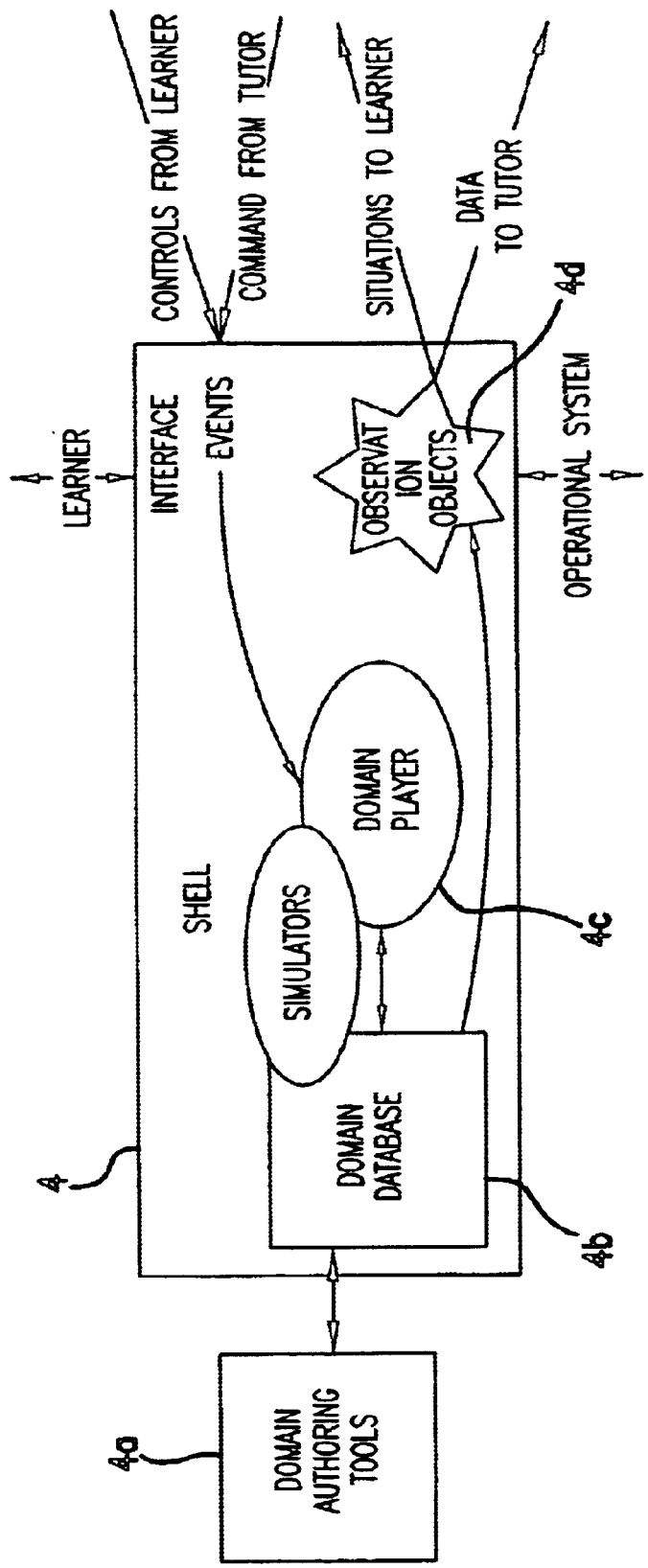
FIG. 2 is a conceptual diagram which illustrates the composition of the Domain Module according to the invention.

The Domain Module 4, which is illustrated in FIG. 2, provides users with interactive presentation of a part of the world (subject matter) under study that can include text, pictures, sounds, video, animation, multimedia, expert systems, simulations, games, 3D, VR, Internet resources. An authoring tool 4a is used to design and develop these interactive presentations. The Domain Module includes a user interface with learner and an author. In a preferred embodiment, the learner's interaction with domain occurs through domain windows, which can include control/navigation and task performance means. Authors can interact with the Domain Module through the same windows but extended with a capability to edit, check, verify, and debug data entered.

The Domain Module can be closed or open for tutor observation and control. In an open embodiment the Domain Module includes special observation and control means to support Tutor Module's control over the Domain Module.

Figure 3:
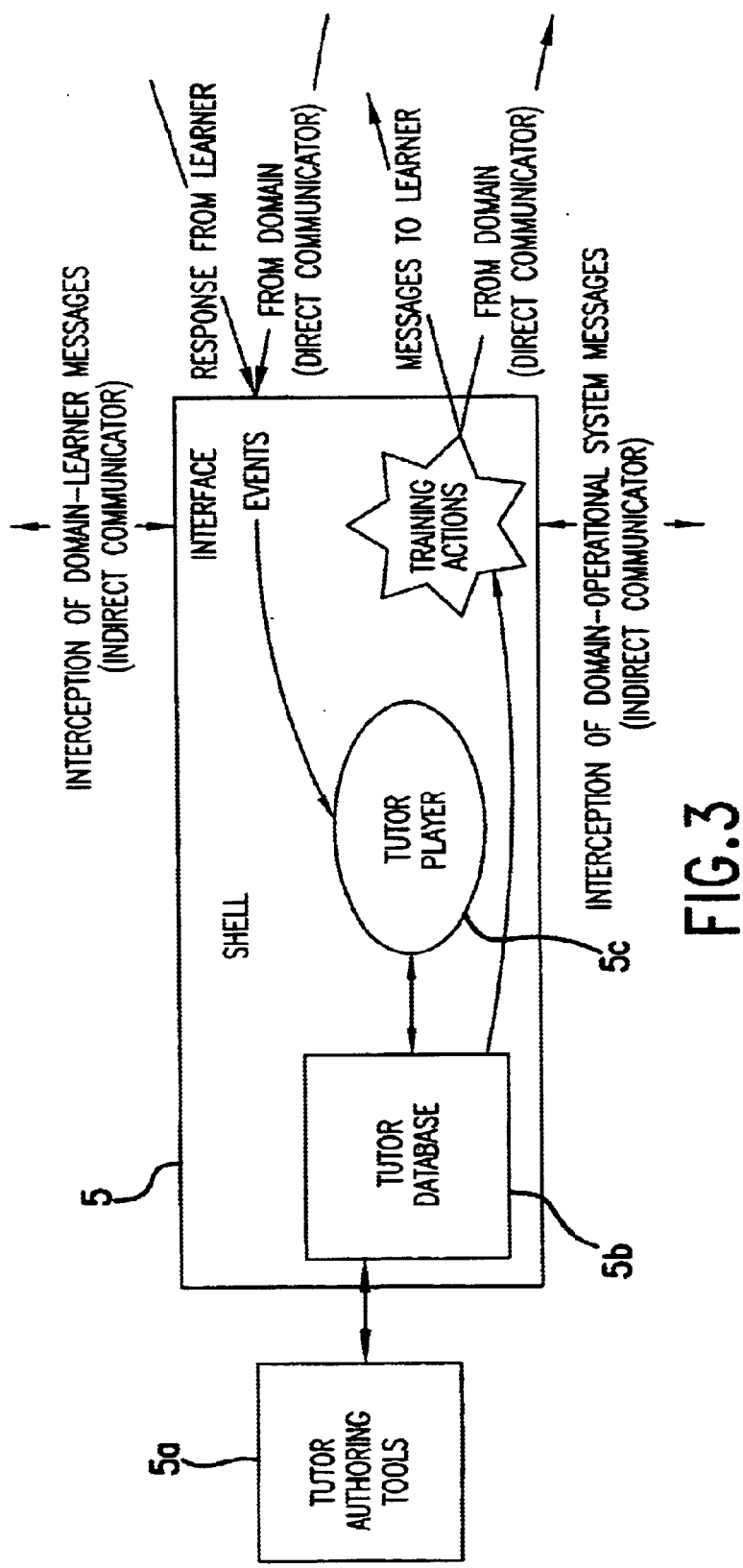
FIG. 3 is a conceptual diagram which illustrates the composition of the Tutor Module according to the invention.

The Tutor Module is illustrated in FIG. 3. It simulates a tutor's activity and provides monitoring and control over a learner's study of the domain and tasks performance. To design and develop these specific capabilities it includes an authoring tool 5a. The Tutor Module includes also a user interface with a learner and an author. Learner's interaction with the Tutor Module is realized through a tutor window, which can contain control and communication means as well. Authors can interact with the Tutor Module through the same window but extended with a capability to edit, check, verify, and debug course designed. The Tutor Module contains also means for capturing learner's behavior and control over Domain Module through direct and indirect communication means.

Overview of System Operation

An entire cycle of system operation consists of the following phases:

(1) Specification of customer order for course design in terms of target audience, particular domain, job/tasks, and training objectives;

(2) Pre-authoring session for an analysis of target audience, particular domain, job/tasks, and training objectives;

(3) Authoring session of the course synthesis (design and development) for target audience, particular domain, job/tasks, and training objectives;

(4) Course release, testing, and debugging;

(5) Course implementation on audience (with at least one learner);

(6) Course outcome analysis. If the outcome does not match the order specification, then returning to (2) for the next iteration of the system operation.

A course order specification includes at least definitions of (1) target audience, (2) domain, (3) job/tasks, and (4) objectives;

(5) Post-testing threshold.

A pre-authoring phase includes (1) An analysis of the target audience and filling out and audience database with the audience profile data;

(2) Iterative Job/tasks decomposition aimed to meet pre-defined audience profile and filling out the job/task database;

(3) Mapping of job/tasks decomposition results into the audience profile to check mutual correspondence. If there is no mutual correspondence, return to (1–2) for corrections;

(4) Training objectives definition inside the job/tasks and outside of the audience profile;

(5) Decomposition of each training objective into sub-objectives;

(6) Splitting each sub-objective into behavioral sub-objective (behavior patterns) and cognitive sub-objective (cognitive items);

(7) Interactive mapping of behavioral sub-objectives into job/tasks to check their necessity and sufficiency for job/tasks. Corrections if it is necessary.

(8) Interactive mapping of cognitive sub-objectives into audience profile to check sufficiency of audience profile for these cognitive objectives. Corrections if it is necessary.

A course authoring includes the following steps (1) Presenting the author a template "Course properties" to fill out. It includes course name, ID, author's name, version name, short description, course status, modes statuses, difficulty levels, style parameters, and association with corresponding Domain Module;

(2) Presenting to the author a generic template to design a specific map of the course. The template includes pre-test, introduction, units, post-test, and conclusion. An author should select at least one of them for the course.

(3) If the author selected a pre-test, then pre-test authoring is performed;

(4) If the author selected an introduction, then presenting him/her a set of introduction templates for choice. Each template may have a specific appearance, but the same content structure identifying pre-defined target audience, job/tasks, training objectives, and recommendations what to do;

(5) If the author selected a post-test, then post-test is performed;

(6) If the author selected a conclusion, then presenting to him/her a set of conclusion templates for a choice. Each template may has specific appearance, but the same content structure including congratulations to the learner, the objectives achieved, a list of job/task/needs relevant, and recommendations what to do next;

(7) If the author selected Units, then course structuring by entering and editing a unit list and prerequisite relations among units (unit flowchart);

(8) Checking, verification, and correction of entered data.

In the course implementation phase each learner goes through the login procedure to begin. After that the system presents him/her a list of available courses and units. The learner makes his/her choice and starts the selected course/unit. Within the course/unit run the learner has a choice to use the Domain Module only or together with the Tutor Module. Using the Domain Module only, the learner can navigate and act in it through a "domain window". In this case he/she studies the domain via a self-driven mode without any control from the Tutor Module. It is not an effective way for learning and very often learners encounter learning problems. To resolve these problems in the present system the learner can activate the Tutor Module at any time (even before encountering any problem).

Even when not activated (in the self-driven learning mode of the Domain Module), the Tutor Module is not entirely passive. It observes the learner's behavior and makes its own "understanding" of what is going on with the learner and how he/she meets learning objectives and resolves learning problems. When the learner achieves terminal objectives, the Tutor Module informs the learner about it. So the present system in its passive state represents an "Intelligent Learning Environment".

In its activated state, the Tutor Module begins to communicate with the learner through a "tutor window" which appears, navigating and directing the learner in the domain to meet learning objectives and resolve the learner's problems in the most effective way.

In the learning stage, the learner has an extra capability of control over the tutor's module as well as by selection of currently preferred tutoring modes and styles.

The Domain Module

Definition. The Domain Module (FIG. 2) is a computer application program representing a part of the system's computer program, which provides authors with the capability to enter and edit domain content, and learners with the capability to navigate through course content and study it in his/her own way; and in one preferred embodiment, it provides the Tutor Module with observations about domain situations and learner's actions in the Domain Module. The domain content generated by the Domain Module can include any text, pictures, sound, animations, and video. It can comprise multimedia interactive presentations, interactive simulations, games, expert systems, 3D environment, and Virtual Reality with appropriate control/navigation and task performance means. In some embodiments the Domain Module can include Intranet and Internet resources.

The Domain Module can be represented by another training system of lower level (such as CBT, case-based ITS, rule-based ITS, . . . ), which can be open enough for learner behavior observation and control over it by the present Tutor Module.

Properties. To be able to support easy authoring and high quality of learning/tutoring, the Domain Module possesses certain properties:

In the preferred embodiment the Domain Module can deliver to a learner realistic content in interactive multimedia, simulation, VR media form.

It can be used autonomously for self-driven learning;

For easy design by non-programmer authors, it allows plug in of the existing media editors and authoring systems.

For easy access and effective learning, domain content should be structured by author and provided with browsing and navigation capability.

It should include interactive task performance means as well to activate learning.

For the best learning/training, complex domains should be represented by authors on a different level of abstraction: from textual/graphic abstract presentations to more realistic simulations and virtual reality.

For adaptation to different learners, a domain should be represented in several levels of difficulty and be oriented to different learning styles and preferences. So, as a rule, the domain representation should be redundant.

It can contain pre-stored and/or generated materials; the former can increase the speed, the latter can reduce redundant storage.

In preferred embodiment Domain Module should allow embedding of specific "observation objects" for informing the Tutor Module about the domain situations and learner behavior.

A Domain Module should allow the Tutor Module control over the domain content presentation to the learner.

Functionality. The Domain Module has at least two main stages of functioning: content authoring support and content delivery to the learner. In addition, one embodiment includes the additional functionality of informing the Tutor Module.

Authoring function: the Domain Module supports the authoring process, in which authors enter and edit domain content data. The Domain Module checks entered data, and supports testing and debugging of domain content as a whole.

Delivery function: the Domain Module delivers specific content to learner in response to his/her control/navigation actions (and dependent on Tutor Module control actions).

Communicative function: in one embodiment the Domain Module delivers a domain situation, learner's control actions, and task performance data to the Tutor Module to inform it what is going on.

Composition. The Domain Module comprises an application program, a simulator, CBT, a low level ITS, or part of virtual world under study, including in a preferable "open" embodiment:

Domain data (content) defining specific domain content under learner's study;

A Domain shell representing generic computer program for the domain data organization and interactive domain simulation including:

A Domain database 4b (FIG. 2) defining generic (domain-independent relations) structure, and for containing specific domain data, its recording, storing, and retrieving capabilities. It is organized in Courses and Course Units (or at least allows mapping data into separate courses and course units). Data can represent domain objects and domain agents under learner's study.

A Domain player 4c (FIG. 2) defining generic domain procedures with domain data and its runtime engine. Different domain players are used to deliver media data such as sound, video, animation, multimedia. In preferred embodiment it includes a tunable computer program for interactive domain simulation, 3D, VR;

Domain-User interface including
   Domain-author interface
   Domain-learner interface In one embodiment Domain-Tutor interface (as a domain part of Direct Communicator);

The Domain authoring tool 4a supporting the domain data input into the domain database by an author. The authoring tool comprises a diversity of media editors that are used to enter new and edit existing domain content in different media form.

Particularly the system's Domain Module can represent and/or include some autonomous systems (such as software packages, applications, simulators, expert systems, and co-learner models) and tutors (such as electronic textbooks, tutorials, tests, CRT, low level ITS) that can be under control of present system's Tutor Module. See FIG. 2.

The domain database 4b organizes and contains the domain data including in the most advanced embodiment the following fields within each course/unit data:

A plurality of domain objects capable of interacting with each other, domain agents, learner, and Tutor Module;

A plurality of domain agents solving their tasks by possibly interacting with each other, domain objects, learner, and Tutor Module;

In one embodiment, a plurality of observation objects providing the Tutor Module with data about domain situations and learner's behavior in these situations;

Specific interface among domain objects, domain agents, learner, and Tutor Module.

The domain player in a preferred "open" embodiment, defines generic domain procedures and provides runtime simulation of domain under learner study for every course/unit comprising Players of domain objects, domain agents, and (in one embodiment) observation objects (generic object/agent's programs working with database filled in with specific said domain data);

Inter-object interface (generic interface to be filled in with specific interface from the said domain database);

The domain-learner interface (generic interface to be filled in with specific interface from the domain database);

Runtime manager;

Timer.

The Domain Module interface includes a domain-author interface, a domain-learner interface, and a domain-tutor interface. The Domain-Author Interface provides an author with a capability to enter, check up, and edit media data. The Domain Module can use plugged in existing media-authoring tool with ready-made computer-human interface that is familiar to potential authors. As a rule all media authoring tools include specific windows delivering content presentation, navigation, request, and interaction means (buttons, menus, multiple choice questions, filing in the blank, hot spots, and so on) with extra capability to edit them and use media templates available.

In one embodiment, to support Domain-Tutor interaction, the author enters specific "observation objects" into the Domain Module and predefines certain commands from Tutor Module to the Domain Module. So the domain-author interface provides the author with this capability as well.

The Domain-Learner Interface provides the learner with flexible access to any part of the Domain Module allowed by the Tutor Module. Because the present Domain Module can use plugged in media editors and multimedia authoring tools, they provide their own players, browsers with their own learner's interface. It includes the domain windows delivering presentations with navigation and interaction means (buttons, menus, multiple choice questions, filing in the blank, hot spots, and so on) but without editing capability of author.

In a preferred embodiment the Domain Module includes observation objects 4d to send control/situation/performance data into the Tutor Module. From the other side, the Domain Module is able to receive and fulfill commands from the Tutor Module.

The domain authoring tools 4a support domain data input into the domain shell including The domain-author interface including Generic templates of domain objects, domain agents and (in one embodiment) observation objects to fill in with specific data;

In one embodiment, generic templates of observation objects to fill in with specific data;

Generic template of said inter-object/agent interface to fill in with specific data;

Generic templates of the said domain-learner interface to fill in with specific data;

Means to input and edit said domain data into domain database;

Means to check and verify the domain data;

Means to debug the course/unit of the Domain Module.

Operation of the Domain Module. There are two main stages of Domain Module operation: authoring and content delivery (or self-driven learning). In the authoring stage the author enters, checks, edits, and debugs a domain content with its control/navigation and interaction means. In the learning stage each learner can navigate through the domain and perform domain task using control and interaction means predefined by authors. In both stages an author or learner can browse the domain database through "domain windows". They can also run any presentations, play sound and video records, run simulations and interact with them. In this manner, a learner can use the Domain Module on his/her own for self-driven learning. An author has the same capability with an extension to edit, check, test, and debug a domain content.

A control over the Domain Module that is "open" for authoring includes:

(1) In the authoring stage, definition of control commands to send to Domain Module;

(2) In the learning/training stage, commands to be sent to Domain Module for execution.

On the other hand, a control over Domain Module that is "closed" for authoring, includes (1) In the authoring stage, capturing/recording interface messages of the user to the Domain Module during user control over the Domain module;

(2) If it is not enough, then capturing/recording of control messages from the operational system to the Domain Module during user control over the Domain Module;

(3) In the learning/training stage, emulation/playing back of captured/recorded messages.

In a preferred embodiment, the "open" Domain Module provides a learner (through a tutor interface) with a choice of (1) Domain glossary (explain me words);

(2) Domain reference material describing (explain me);

(3) Presenting objects and agents in the domain field (show me);

(4) Interactive simulation of objects and agents behavior in the domain to investigate (let me investigate);

(5) Capability to select mission/job/tasks and perform selected mission/job/task by him/herself (let me try myself).

The Tutor Module

Definition. The Tutor Module (FIG. 3) is a computer program representing a part of a system computer program, which simulates human-tutor activity and can be authored by author and activated by learner at any time to manage his/her learning by the most effective way.

Properties. "Intelligence" is the most important property of the Tutor Module. Even before authoring, the Tutor Module has its own pedagogical "knowledge/skills". An intelligent Tutor Module knows exactly "how to teach" learners (how to manage a learning process in order to deliver new experience to the learner, to test mastery, to diagnose and remedy learning problems) by itself without authors. The Tutor Module has also specific knowledge about "whom to teach" (the audience). Learners themselves, in the login step of a learning session, will deliver this information to the Tutor Module, inputting their ID, personal preferences and learning styles. All other personal data (learner's current assessment, achievements, pre-history) the Tutor Module can generate itself and keep in its memory.

To be ready to teach each particular learner, the Tutor Module needs to know concrete audience, domain, course/unit, training objectives, strategy, and style to use. It is going to get information from authors.

In addition to above-mentioned skills (how to teach) and knowledge (whom to teach), the Tutor Module embeds certain knowledge (templates, frameworks) for media domain-related data from authors. The templates and frameworks make authoring process much easier, providing a process of "filling in the blanks" of the shell. As a result, entered data can be automatically checked and interactively verified by the author for consistency and sufficiency. The author can also run and debug a course/unit designed on a different level of detail. All these features significantly simplify authoring, allow the input data to be verified, exclude mistakes and reduce the cost of course design.

In the training delivery session the Tutor can be in passive and active state. In the passive state, Tutor Module "watches over the learner's shoulder" and can capture, recognize, and interpret a learner's behavior in order to understand what is going on with learner's knowledge/skills. The present system with the Tutor Module in a passive state represents a new solution to the so-called "Intelligent Learning Environment". In the active state, on the other hand, the Tutor Module can individually plan, re-plan, and execute training actions delivered through the Domain Module and/or directly to the learner, pursuing predefined training objectives, realizing predefined strategy of training, and realizing predefined tutoring style. The Tutor Module provides learners with a choice of its operations modes.

Functionality. The Tutor Module supports the main functions as follows.

Pre-authoring

Input: Raw data from an author entered through generic templates of author interface;

Result: Entered, tested, and debugged tutor data in a tutor database including target audience,
- domain,
- job/tasks,
- objectives, and
- Post-testing threshold.

authoring

Input: pre-authoring data from previous stage; Raw materials and data from an author entered through generic templates of author interface;

Result: Entered, tested, and debugged tutor data in a tutor database.

In the passive state the main Tutor Module monitors:

Input:

Domain situation data;

Learner's control actions;

Learner's task performance;

Output:

Performance comments, if requested;

Performance advice, if requested;

In a case of "fatal" faults, Tutor Module activation for a remediation session.

In the active state the main Tutor Module function is training:

Input:

Learner personal data and assessments;

Domain situation data;

Learner's control actions in the Domain Module;

Learner's task performance;

Learner's control actions in the Tutor Module;

Output:

The next training action (presentation of a learning material, exercise, task/question, . . . );

Learner's performance Comments;

Performance advice, if requested;

Results:

Switching the modes of training;

Updated assessments of learner's personal data.

Composition

The Tutor Module includes the following components:

Tutor data defining training paradigm/domain/learner/-specific knowledge of tutor;

a Tutor shell comprising ready-made training paradigm/domain/learner/-generic pedagogical knowledge and skills including:

- Tutor database 5b (FIG. 3) for defining and organizing generic tutor data (domain-independent) structure and containing specific tutoring media and metadata (declarative models), its recording, storing, and retrieving capabilities;
- Tutor player 5c (FIG. 3), for defining generic tutoring procedural models and runtime engine. It represents a run-able computer program for tutoring simulation;
- Interface;
- a Tutor pre-authoring tool supporting analysis of target audience, job/tasks, and training objectives;
- Tutor authoring tool 5a supporting the tutor data design, input into the tutor database 5b, and editing by an author;

The tutor database includes sub-databases as follows:

Audience database provides the Tutor Module with a knowledge of a target audience to orient course to;

Job/tasks database that support preauthoring sessions and provides a basis for training objective definition;

Media database filled out by the author with a concrete course/unit structure, objectives, strategy, style parameters, training actions, and models provides the Tutor Module with paradigm/domain specific pedagogical knowledge;

Learner Database filled out by the author with data providing the Tutor Module with knowledge of its audience, person by person.

Figure 4:
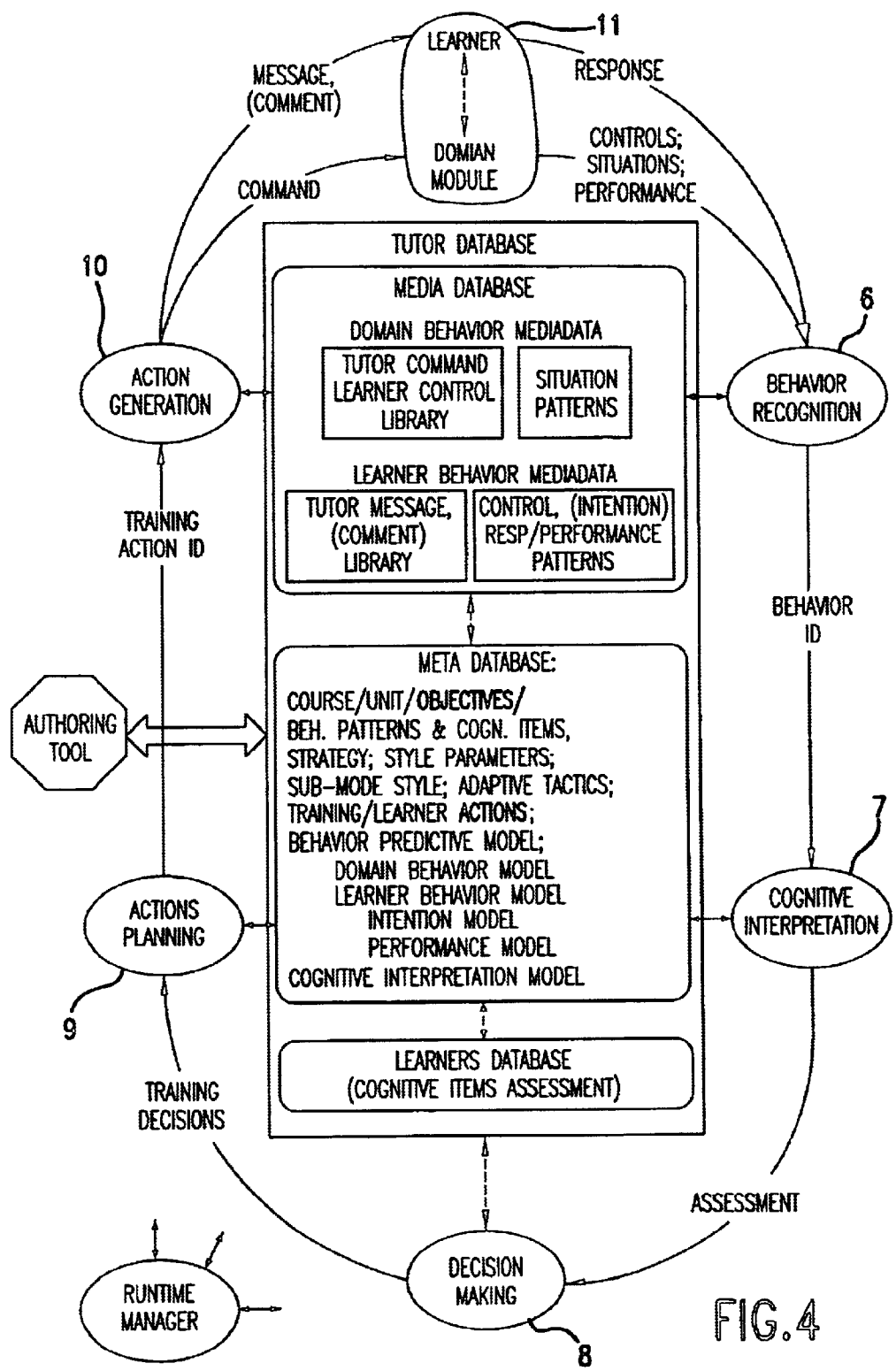
FIG. 4 depicts the functional interconnections among the components of the Tutor module and its functional scheme.

The tutor player 5c (FIG. 3) provides a runtime simulation of tutor activity for any course/unit. As shown in FIG. 4, it comprises the following components:

a Behavior recognition component 6, which compares any captured action of learner in the domain and/or tutor windows with predefined patterns, and decides which one of them has been realized;

a Cognitive Interpretation function 7 for mapping recognized performance patterns ID of the learner into his/her cognitive items assessment with Cognitive Interpretation model.

a Decision Making component 8 for making decisions about sufficiency of training in different modes (learning, pre-test, instruction, practice, remediation, and post-test) and sub-modes (delivery, testing, and diagnosing) and which sub-mode and/or mode to switch next;

an Actions Planning component 9 for planning and selection of the next training action (message to learner, command to Domain Module);

an Action Generation unit 10 for generation of the next training action in a media form;

The Tutor-Learner interface 11 (generic interface template to be filled in with specific interface from the said Tutor Database);

The Runtime Manager 22 (with a timer for a generation of an internal time flow) provides runtime environment for cooperative working of all components in any state (passive or active) and in different modes of active state (pre-test, instruction, practice, remediation, and post-test); and An authoring tool 23.

The Interface 11 includes a Tutor-User interface that provides

Tutor-learner interface (available only in the active state of Tutor Module) A learner communicates with the Tutor Module using the same "tutor window", through which he/she can get any messages such as introduction, task/question posing, explanation, hint, comment, and conclusion.

Tutor-author interface. An author communicates with the Tutor module through a "tutor window", which contains edit, check, verify, and debugging functions. This interface allows the author to fill in all databases and models of Tutor Module.

The Interface also includes a Tutor-Domain Communicator capturing Domain Module situations and learner behavior, and for sending control commands to Domain Module including at least one of the following Direct Communicator between the Domain and Tutor modules. The Tutor Module communicates with the Domain Module in the run-time sessions of course debugging or learning. In both of the Tutor Module states (active and passive), the Domain Module transfers the learner's control actions, domain situations, and learner's performance into the Tutor Module. In the active state, the Tutor Module transfers control events into the Domain Module. This interface is provided with tutor's observation objects 4d (FIG. 2) embedded in the Domain Module 4 (FIG. 2) and the domain's actions predefined in action library of Tutor Module. The observation objects send predefined events into Tutor Module. The Tutor Module captures them and its training actions send control commands to Domain Module.

Domain-Learner Interface Communicator providing interception and emulation of Domain-Learner exchange;

Finally, the Interface also includes a Domain-Operational System Communicator providing interception and emulation of Domain-Operational system exchange.

A tutor pre-authoring tool supports a detailed analysis of target audience, job/tasks, and training objectives and includes The tutor-author interface including
  Generic template for specific course order representation;
  Generic template for specific target audience profile representation;
  Generic template for specific jobs/tasks representation;
  Generic template for specific training objectives representation including
    Cognitive items template;
    Behavioral patterns template;

A component for input, editing and checking of specific data in tutor database;

Analysis means supporting decomposition of audience profile, job/tasks, and objectives;

A component for classifying each leaf objective into cognitive item and behavioral patterns (behavior predictive model);

A component for mapping
  job/tasks analysis results into audience profile to check mutual correspondence;
  behavioral patterns of training objectives (behavioral predictive model) into job/tasks to check their necessity and sufficiency for job/tasks;
  cognitive items of training objectives into audience profile to check sufficiency of audience background, experience, and other cognitive items for these objectives.

The tutor authoring tools 5a (FIG. 3) provide entry and editing capability for the tutor data including The tutor-author interface including
  Generic templates of the said metadata including
    Template with audience data to orient authoring to;
    Template with cognitive items to orient authoring to;
  Generic templates of the said media data;

A component to structure a course into units and flowcharting them;

A component to input and edit specific said tutor data into tutor database;

A component to check and verify the tutor data;

A component to run and debug the course/unit of the Tutor Module.

Operation of Tutor Module. The main operating stages of the Tutor Module are pre-authoring, authoring, and learning/training implementation. In the pre-authoring stage, the authoring component of the Tutor Module supports the author's specification of course order, audience profiling, job/tasks analysis, and training objectives definitions. The author can edit, check, and verify entered data as well. On the other hand, in the authoring stage, the authoring component of the Tutor Module supports the author's course structuring, training strategy and style definition, entering of training actions (messages, commands), models, performance patterns, and comments into the tutor database. The author can edit, check, and verify entered data as well.

A course implementation phase includes the following steps:

(1) Providing a learner with a registration means;
(2) Providing a system with the learner personal data;
(3) Providing a learner with a choice of a course/unit to study;

(4) Providing a learner with a domain and tutoring module for the course selected;

(5) Providing a system with the learner's initial assessment within the course/unit selected;

(6) Providing an interaction of the learner with domain for course study;

(7) Providing an interaction of the learner with tutoring module for its activation, mode selection, objectives selection, and style adjusting;

(8) Checking if a current assessment of the learner matches the objective or the learner exits it, and stopping training if so; otherwise continue;

(9) If learner has not activated the Tutor Module, then the Tutor Module realizes a passive state;

(10) If learner has activated the Tutor Module, then the Tutor Module realizes an active state;

(11) Providing a learner with capability to stop the system anytime;

(12) Storing of updated learner's data.

In the passive state the Tutor Module "observes" learner's behavior in the Domain Module without any interruption and training actions, unless the learner requests it. It captures learner's behavior data transferred from domain observation objects through domain-tutor interface, including control/navigation actions by the learner in the domain, the current domain situation, and the learner's task performance in the Domain Module.

Learner activity (control/situation/intentionsà performance) is recognized by the behavior recognition component of the Tutor Module, on the basis of patterns predefined by an author. Recognized learner's behavior is interpreted by the cognitive interpretation component of the Tutor Module that provides mapping of each performance pattern into the assessment of learners' current knowledge/skills. The result of interpretation is a personal assessment of the learner's current cognitive items (knowledge/skills). The learner can ask the system to comment on his/her performance (comment me), to evaluate his/her performance (evaluate me), and to advise what to do next (advise me). The Tutor Module provides this service. The Tutor Module wakes up automatically in case of the learner's "fatal" faults.

In the active state the Tutor Module extends its passive state operation with decision making and planning capabilities in accordance with objectives, strategy, tactics, and style predefined by the author, and mode pre-selected by the learner (on strategic control level). The current assessment of the learner's knowledge/skills is used further in the decision making component to make (tactical control level) decisions on what to do next (begin, continue, or stop content delivery, checking knowledge, or diagnosing bugs). This decision and the current assessment are then used by the planning component to define the next tutoring action (on operational control level).

Figure 5:
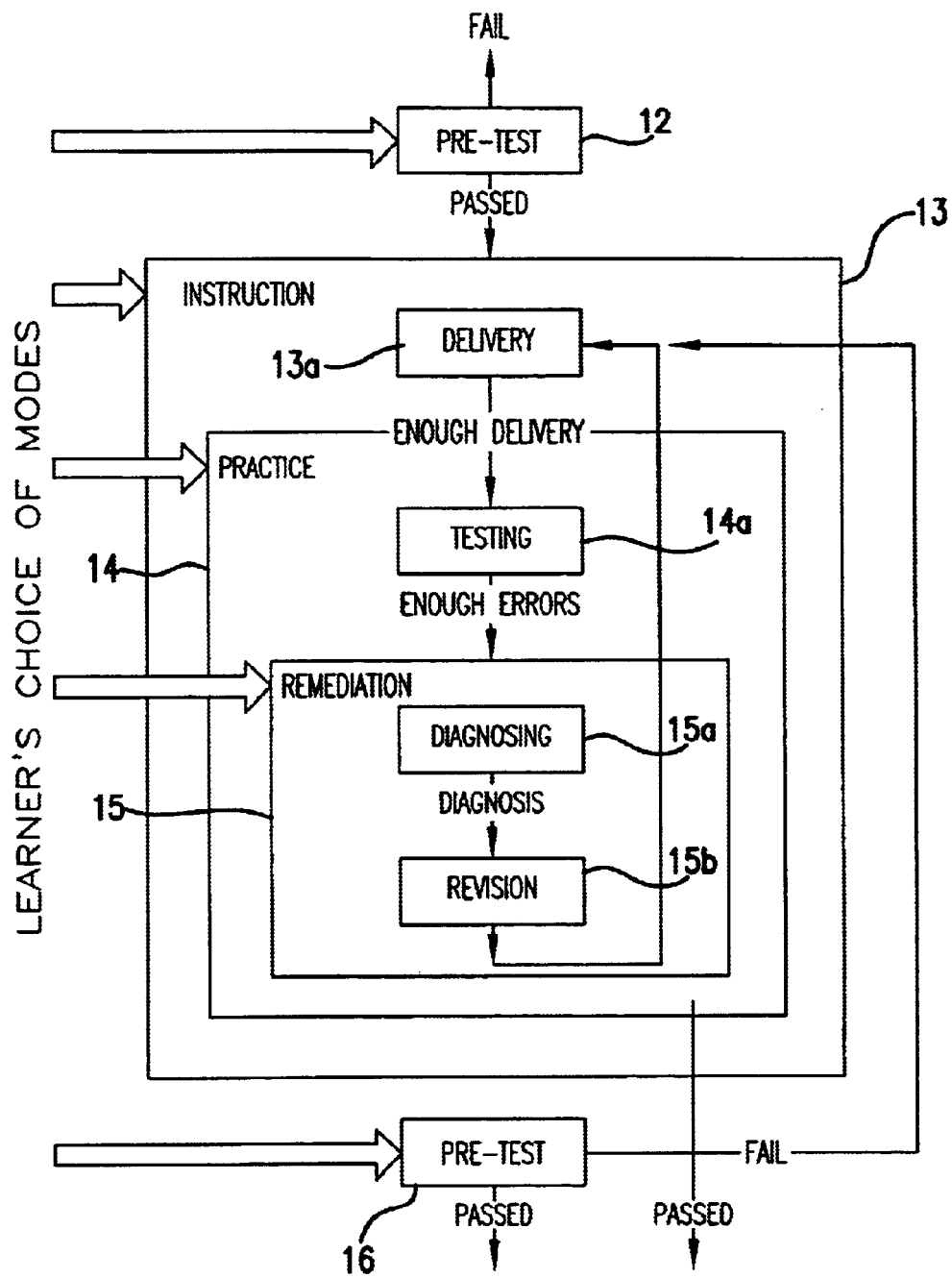
FIG. 5 is a conceptual diagram which illustrates the hierarchal structure of the tutoring modes according to the invention.
Figure 6:
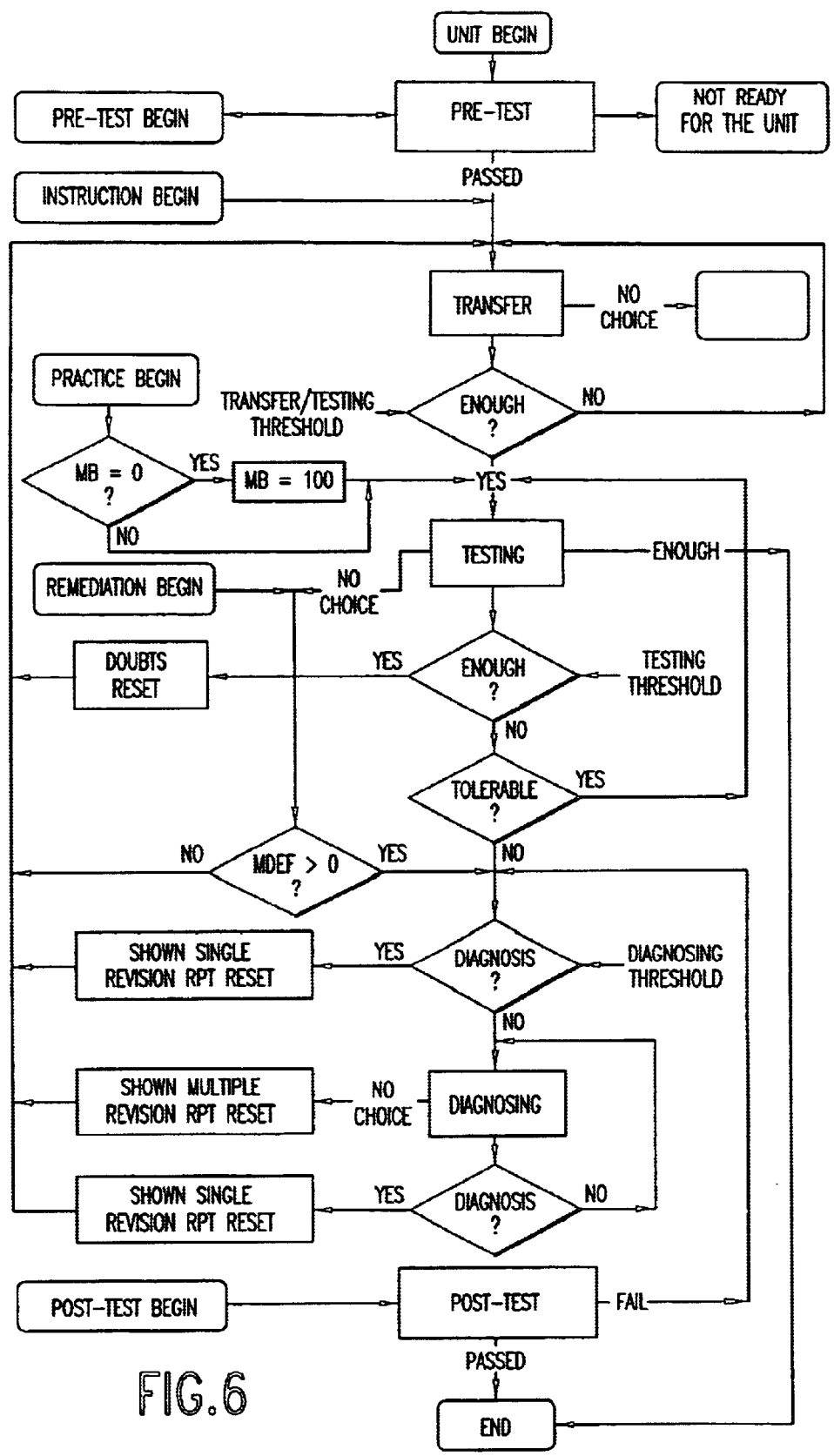
FIG. 6 is a flow chart which illustrates the operation process implemented by the Tutor module.

The active state of the Tutor Module includes f five operational modes, including pre-testing, instruction, practice, remediation and post-testing, as shown in FIGS. 5 and 6.

The goal of the pre-test mode 31 (FIG. 6) in the course/unit is to check that the learner has all necessary background for the particular course/unit of study. It is not necessary to have a pre-test for every course unit. But if the author has prescribed it for the particular course/unit, then all learners should pass it. The Tutor Module commences operation in this mode every time, independently of the learner's control (if the student did not pass it successfully before).

In the pre-testing mode the planning component uses tasks and questions as training actions assigned for "pre-test" in their properties windows. In accordance with the author's choice, pre-testing tasks and questions can be presented to the learner in differing styles:

at once (batch);

in a preset sequence that is the same for all learners (linear);

in a preset script that is the same for all learners, wherein the next task/question depends on previous performance of the learner (branching), and by intelligent adaptive sequencing, wherein the next task/question depends on the current assessment of the learner's knowledge/skills.

It is up to the author which style of presentation to pre-define for learners. (In the absence of a selection, the system selects intelligent adaptive sequencing as a default).

Planning of batch testing is realized by the learner him/herself.

There is no need to plan linear tests because the whole sequence of tasks/questions is fixed. All that is necessary is to decide when the learner has passed the test. That is exactly what the decision component is doing by comparing a learner's current assessment of pre-tested items with a predefined pre-testing threshold.

Planning of the adaptive test is done in three stages:

Filtering of pre-test tasks/questions;

Weighting of each task/question's power (coverage of non-tested items yet);

Selection of the task/question with the maximal power

Each task/question is generated and presented to the learner; and the learner's performance is captured, and recognized. In the intelligent option it is also interpreted and assessed. In this case the decision component stops pre-testing when the current assessment for all pre-tested items becomes higher then the predefined threshold "Pre-testing threshold".

The goal of the instruction mode 13 (FIG. 5; see steps 33–34 in FIG. 6) is to manage delivery and mastery of new content in accordance with predefined objectives, strategy and style.

This mode represents a combination of the Delivery sub-mode 13*a* and the Practice mode 14 (FIG. 5; see steps 37–39 in FIG. 6).

In the Delivery sub-mode of the Instruction mode 13*a* (FIG. 5; see step 34 in FIG. 6), the planning component of the Tutor Module can select all training actions assigned to the Instruction mode in the action properties window by destination "Instruction". These training actions are called here "teaching actions". In accordance with author's choice of Delivery Style they can be presented to the learner in differing style:

at once (batch), in a preset sequence that is the same for all learners (linear), in a preset script that is the same for all learners, wherein each next action depends of previous performance of the learner (branching); and by intelligent adaptive sequencing, wherein each next action depends on the current assessment of the learner's current knowledge/skills, his/her personal preferences and learning style.

It is up to the author which presentation style to pre-define for learners. (Absent his/her selection, the last option takes place automatically).

The Batch instruction requires no planning at all. It is realized by the learner him/herself. Also, there is no need to plan a linear instructional sequence, because it is fixed. All that is necessary to do is decide when the learner has passed certain thresholds. This function is performed by the decision component, by comparing the learner's current assessment of expected knowledge/skills items mastery with a threshold "Delivery threshold".

Planning of the intelligent adaptive Delivery on the other hand is done in three stages:

Filtering of teaching actions;

Weighting of each teaching action's current power; and

Selection of teaching action with the maximal weight and difficulty level (that is still appropriate for the learner).

The selected teaching action is realized, the learner's responsive performance is captured and recognized. In intelligent delivery, it is also interpreted and assessed. In this case the decision component 35 (FIG. 6) stops the instruction to begin the practice mode when a gap between current assessments of expected and demonstrated cognitive items becomes higher than a predefined threshold.

The goal of the practice mode 14 (FIG. 5; step 37 in FIG. 6) is to manage mastery of the unit knowledge/skills delivered before, detect mistakes of the learner and remedy their causes in accordance with predefined training strategy, training style, the learner's personal preferences and learning style. This mode represents a combination of Testing sub-mode 14*a* and Remediation mode 15. (See steps 36 and 40 in FIG. 6.)

In the Testing sub-mode of Practice (step 36 in FIG. 6) the planning component can use all training actions with destination "Practice" in an action Properties window. Usually these actions ("testing actions") are of a testing type: tasks or questions. In accordance with author's choice they can be presented to the learner in differing styles:

All at once (batch), in a preset sequence that is the same for all learners (linear);

in a preset script that is the same for all learners, wherein each successive problem choice depends on the prior performance of the learner (branching); and by intelligent adaptive sequencing, wherein each next problem choice depends on the current assessment of the learner's knowledge/skills, his/her personal preferences and learning styles.

It is up to the author which one to pre-define for learners in the course unit. (As a default the system selects the intelligent option.)

Batch instruction requires no planning at all. It is realized by a learner him/herself. Also, there is no need to plan the linear instructional sequence, because it is fixed. All that is necessary is decide when the learner has passed mastery thresholds, which is done by the decision component by comparing a learner's current assessment of demonstrated knowledge/skills mastery with a threshold "Testing threshold". (See step 41 in FIG. 6.)

Planning of the intelligent adaptive Testing is done in three stages:

Filtering of testing actions;

Weighting of each testing action's current power;

Selection of testing action with the maximal power.

The selected problem is realized, the learner's responsive performance is captured and recognized. In the intelligent testing it is also interpreted and assessed. In this case it continues until the current assessment of demonstrated knowledge exceeds an expected knowledge/skills assessment for all knowledge/skills items (step 41 in FIG. 6). Then the decision component stops the practice and switches to remediation mode when the learner has made more mistakes than set by the author in the parameter "Tolerance threshold" (step 42 in FIG. 6).

The goal of the remediation mode 15 (step 40 in FIG. 6) is to manage the search of learning problems (knowledge/skills bugs—causes of mistakes made) and fix them by an instruction at a reduced level of difficulty in accordance with a predefined strategy and style. For this purpose, remediation comprises a Diagnosing sub-mode 15*a* (FIG. 5; step 43 in FIG. 6) and corrective re-instruction mode 15*b* at a reduced level of difficulty that begins from causes of mistakes. (See steps 46–48 in FIG. 6.)

In the Diagnosing sub-mode of Remediation, the planning component can use all training actions with destination "Practice" and "Explanation" in their properties window. Usually these actions are of a testing type (tasks and questions) and explanation type (training actions and/or messages on reduced level of difficulty). In accordance with author's choice they can be presented to the learner in differing styles:

at once (as a batch of available explanations for self-remediation);

in a preset sequence that is the same for all learners (linear procedure);

in a preset script that is the same for all learners, wherein each next action depends of previous performance of learner (branching); and by adaptive sequencing, wherein each successive action depends of current assessment of learner's knowledge/skills, his/her personal preferences and learning styles.

It is up to the author which style to pre-define for learners in the course unit. (The default is the last, intelligent choice).

Batch remediation requires no planning, being by learner him/herself.

There is no need to plan linear instructional sequences predefined by author as well, because they are fixed. All that is necessary to do is to decide when the learner has reached the required level of mastery. This is done by the decision component, by comparing the learner's current assessment of demonstrated knowledge/skills mastery with a predefined threshold "Testing threshold".

Planning of the intelligent adaptive Diagnosing is done in three stages:

Filtering of diagnosing actions;

Weighting of each diagnosing action's current diagnostic and/or explanative power; and Selection of diagnosing action with a maximal diagnostic power.

The selected diagnosing action is realized and learner's responsive performance is captured and recognized. In intelligent remediation, it is also interpreted and used for learner's knowledge/skills assessment. In this case the decision making component (steps 45 in FIG. 6) stops the remediation and returns to the practice mode, when all suspected knowledge/skills have been remedied.

The goal of the post-test mode 16 (FIG. 5; step 44 in FIG. 6) is to assure that the learner has mastered all knowledge/skills of the course unit. It is not necessary to have the post-test in every unit of the course. But if the author has designed the post-test in the course unit, then all learners can use it in order to bypass regular instruction, if they believe they know the unit material enough.

In the post-test mode the planning component uses training actions of testing type: tasks and questions with destination "Post-Test". In accordance with author's choice they can be presented to the learner in differing styles:

at once (batch), in a preset sequence that is the same for all learners (linear);

in preset script that is the same for all learners and depends on previous performance of the learner (branching); and by intelligent adaptive sequencing, that depends on current assessment of the learner's knowledge/skills.

It is up to the author which style to pre-define for learners. (The last option is the default).

Planning of batch testing is realized by learner him/herself.

There is no need to plan linear tests because the sequence of tasks and questions is fixed. All that is necessary to do is just to decide when the learner has passed the test. The decision component does this by comparing the learner's current assessment of demonstrated knowledge/skills items with predefined threshold "post-test threshold".

Planning of the intelligent adaptive post-test is done in three stages:

Filtering of post-test tasks/questions only (particularly, only a task/question with destination "post-test" in its properties window);

Weighting of each task/question;

Selection of the task/question with maximal weight.

Each task/question is presented to the learner; and his/her performance is captured and recognized. In intelligent post-test, it is also interpreted and assessed. In this case the decision making component stops post-testing, when the current assessment of demonstrated knowledge/skills items exceeds the threshold "post-test threshold" for every item.

The Tutor Module self-improvement capability is realized through the following steps:

1. Delivery of new knowledge/skills to the learner;
2. Testing of learner's knowledge/skills (and storing of unexpected answers of the learner);

If testing result is positive, then:

Increment fuzzy mapping ($DM1j*l*v*$, $DM2j*l*v*$, $DM3j*l*v*$,) of all teaching actions (which participated in this successful passage) outcomes into cognitive items predefined in cognitive interpretation model;

Update prospective fuzzy mapping (DM4) of these teaching actions outcomes;

Increment fuzzy mapping ($OM1j*i*v*$) of those parts of pre-stored testing actions/outcomes that are direct prerequisites (constitutes a background) to this success;

Update background fuzzy mapping (OM2) of these testing actions/outcomes;

Store fuzzy mapping ($OM1j*i*v*$) of all testing actions/outcomes which participated in positive assessment of new knowledge/skills;

If testing result is negative, then go to the next item; otherwise, repeat.

3. Diagnosing of the learner's Knowledge/skills;
4. Diagnosis posing;
5. Corrective instruction;
6. Checking of re-instruction success;

If Checking result is positive:

increment fuzzy mapping ($OM2j*i*v*$) of testing action/outcome that have detected this Diagnosis;

increment fuzzy mapping ($OM2j*i*v*$) of all testing actions/outcomes that have been used in Diagnosing procedure.(in distinguishing this diagnosis from others possible and localizing it);

increment fuzzy mapping ($DM1j*l*v*$, $DM2j*l*v*$, $DM3j*l*v*$) of all teaching actions/outcomes which have successfully corrected this Diagnosis;

update prospective fuzzy mapping (DM4) of these teaching actions outcomes;

save fuzzy mapping ($OM1j*i*v*$) of testing action/outcome which has positively checked Diagnosis correction;

If Checking result is negative, then go to the next item.

7. Interactive author investigation and diagnosing of ITS Fault Reasons on the basis of automatically system recorded history of unsuccessful ITS solutions.
8. Manual Correction of ITS metadata by an author.
9. Interactive Testing of Correction Success.

Where:

DM k $j*l*v*$—fuzzy mapping of teaching actions (l)/outcomes (v) into cognitive items (j);

OM k $j*i*v*$—fuzzy mapping of testing/diagnosing actions (i)/outcomes (v) into cognitive items (j);

l—is a number of teaching action;

i—is a number of testing/diagnosing action;

v—is a number of performance pattern extended with a case of unrecognizable performance of learner (that considered as a fault performance);

k—(the first index) is a interpretation modality index having value: effect (expected knowledge/skills), background (demonstrated knowledge/skills), fault causes (suspected knowledge/skills);

k=1 means cognitive effect of learner's v-th performance predefined by the author;

k=2 means background of learner's performance learner's v-th predefined by the author;

k=3 means possible causes of learner's v-th performance predefined by the author;

k=4 means full-scale cognitive effect of learner's performance automatically calculated by the system for l-th or i-th training action;

k=5 means full-scale background of learner's performance automatically calculated by the system for l-th or i-th training action;

k=6 means full-scale possible causes of learner's performance automatically calculated by the system for l-th or i-th training action.

The Tutor Module Database

As previously noted the Tutor Module database includes the following sub-databases:

Audience database;

Job/tasks database including;

Meta database;

Media database; and

Learner's database;

Audience Database. The audience database defines the Tutor Module's knowledge of its audience including the following main record fields.

Registration data defining at least an average age, education, and experience of the audience.

Domain-independent data of the audience defining

Stable data to take into account in training process including

Learning preferences (theoretical, practical; . . . )

learning Style (for instance: verbal, visual, kinesthetic);

Unstable data to adapt training including
  Background recall;
  Generic knowledge/skills recall;
  Prerequisite courses/units recall;
  Initial difficulty/granularity level;
  Initial control level.
Dynamic data to maintain in training process
  Attention;
  Intentions;
  Motivation.
Domain-dependent data of the audience defining for each course the current status of course learning, including current status of unit learning for each unit within the course.
For each objective/cognitive item within the unit, this includes a personal assessment of
  Expected mastery of cognitive item;
  Demonstrated mastery of cognitive item;
  Suspected mastery of cognitive item for single cause of errors made;
Job/Tasks database. The job/tasks database includes the record fields in following hierarchy:
  Job including:
    Task that may include a sequence of subtasks;
    Subtask that may include a sequence of subtasks;
Meta database. The meta database comprises data about media data. Within each course it includes:
  Course Properties including
    ID,
    Title;
    author's name,
    version name,
    short description,
    target audience profile (mapping),
    job/tasks (mapping),
    status (ready to use, under development),
    Modes statuses:
      Pre-Test (available, not available)
      Instruction (available, not available)
      Practice (available, not available)
      Remediation (available, not available)
      Post-Test (available, not available)
    Mode/submode styles:
      Pre-Test style (bunch, linear, branching, intelligent)
      Delivery style (bunch, linear, branching, intelligent)
      Testing style (bunch, linear, branching, intelligent)
      Diagnosing style (bunch, linear, branching, intelligent)
      Post-Test style (bunch, linear, branching, intelligent)
    Sub-mode tactics:
      adaptive delivery (teaching) planning:
        Objectives are the first to achieve (challenging tactics);
        Background are the first to create (grounding tactics);
        Create minimally necessary background for the next available objective (by default)
      adaptive testing planning:
        The first items delivered—the first tested;
        The last items delivered—the first tested;
        The maximal coverage of delivered items (by default).
      adaptive diagnosing planning for an author and a learner choice:
        The closest causes—the first to check;
        The deepest causes—the first to check;
        The maximal distinguishing of all suspected causes (by default).
    Style parameters
      Delivery Threshold (0–100%)
      Testing Threshold (0–100%)
      Diagnosing Threshold (0–100%)
      Delivery/Testing Threshold (0–1000)
      Tolerance threshold (0–1000)
      Difficulty range,
      Difficulty switching threshold;
    Association with corresponding Domain Module and media data;
  Course pre-test (optional) metadata;
  Course Introduction (recommended) metadata (audience, job, tasks, objectives);
  Course post-test (optional) metadata;
  Course Conclusion (recommended) metadata (job, tasks, objectives achieved, next courses for new objectives, tasks, jobs);
  Units flowchart defining a course training strategy:
    Unit list;
    Unit prerequisite relations;
For each unit:
  Unit Properties including:
    ID,
    Title;
    author's name,
    version name,
    short description,
    target audience profile (mapping),
    job/tasks (mapping),
    status (ready to use, under development),
    Modes statuses:
      Pre-Test (available, not available)
      Instruction (available, not available)
      Practice (available, not available)
      Remediation (available, not available)
      Post-Test (available, not available)
    Mode styles:
      Pre-Test style (batch, linear, branching, intelligent)
      Instruction style (batch, linear, branching, intelligent)
      Practice style (batch, linear, branching, intelligent)
      Remediation style (batch, linear, branching, intelligent)
      Post-Test style (batch, linear, branching, intelligent)
    Sub-mode tactics:
      adaptive delivery (teaching) planning;
        Objectives are the first to achieve (challenging tactics);
        Background are the first to create (grounding tactics);
        Create minimally necessary background for the next available objective (by default).
      adaptive testing planning:
        The first items delivered—the first tested;
        The last items delivered—the first tested;
        The maximal coverage of delivered items (by default).
      adaptive diagnosing planning for an author and a learner choice:
        The closest causes—the first to check;
        The deepest causes—the first to check;
        The maximal distinguishing of all suspected causes (by default).
    Style parameters
      Delivery Threshold (0–100%)
      Testing Threshold (0–100%)
      Diagnosing Threshold (0–100%)

Delivery/Testing Threshold (0–1000)
Tolerance threshold (0–1000)
Difficulty range,
Difficulty switching threshold;
Association with corresponding Domain Module and media data;
Unit pre-test (optional) metadata;
Unit Introduction (recommended) metadata (audience, job, tasks, objectives);
Unit post-test (optional) metadata;
Unit Conclusion (recommended) metadata (job, tasks, objectives achieved, next units for new objectives, tasks, jobs);
Objectives flowchart defining a unit training strategy;
Objective list;
Objectives prerequisite relations;
For each objective:
Objective properties including
ID,
Title;
short description,
target audience profile (mapping),
job/tasks (mapping),
Style parameters
Post-Testing Threshold (0–100%)
Difficulty range,
Behavioral patterns:
Post-test tasks/questions;
Standard Performance;
Cognitive Items flowchart including:
Cognitive items list:
Prerequisite relations among cognitive items (training strategy);
For each cognitive item:
Cognitive Item properties including
ID,
Title;
short description,
Type:
Knowledge element with a desired mastery degree or
Skills element with a desired mastery degree or
Mental model aspect with a desired mastery degree or
Unintentional knowledge/skills deficiencies (misconceptions, misunderstanding, or bugs);
target audience profile (mapping),
Style parameters
Post-Testing Threshold (0–100%)
Difficulty range,
Learner control actions:
Navigation actions;
Domain controls (buttons)
Training Actions including the following record fields:
ID;
Title;
Type (teaching, testing);
Form (message, command, both);
Pre-conditions;
Post-Conditions;
Difficulty Level;
Learning Time;
Destination Modes (Pre-Test, Instruction, Practice, Remediation, Post-Test);
Sub-actions script (optional);
Association with a media level of the training action (message, command).

Behavior predictive model (may be case-based model, neural net model, . . . ):
Domain behavior model (may he case-based model, neural net model, . . . ):
Tutor's command ID list to the Domain Module;
Learner's control action ID list;
Domain situation pattern ID list;
Mapping of command IDs and control IDs into situation Ids (depends on the Domain Module state)
Learner behavior model (may be case-based model, neural net model, . . . ):
Learner intention model (may be case-based model, neural net model):
Tutor message ID list;
Learner's control action ID list;
learner's intention ID list;
Mapping of tutor's messages IDs and/or learner's control actions IDs into learner's intentions IDs;
Learner performance model (may be case-based model, neural net model):
learner's intentions ID list;
domain situations ID list;
learner's performance patterns IDs;
Mapping of learner's intention ID and/or domain situation ID into learner's performance patterns IDs (that depends on current assessment of learner's cognitive items).
Cognitive Interpretation model (may be case-based model, neural net model):
Behavioral patterns ID;
Cognitive Items ID;
Mapping of the behavioral patterns IDs into the cognitive items IDs;
Mapping of the behavioral patterns IDs into the job/tasks;
Particularly, the cognitive interpretation model can be represented in pre-stored form by two four-dimensional matrices of numbers from 0 till 100%:
$DM[m][l][j][v]$ and $OM[m][i][j][v]$.
Where:
l—is a number of teaching action;
i—is a number of testing/diagnosing action;
v—is a number of a behavioral pattern;
m—is a interpretation modality index having value: effect, background, causes;
m=1 means cognitive effect of learner's performance (expected knowledge/skills);
m=2 means background of learner's performance (demonstrated knowledge/skills);
m=3 means possible causes of learner's fault performance (suspected knowledge/skills);.
To simplify use of this model in a learning/training session, the system initially extends it into $DM[k][l][j][v]$ and $OM[k][i][j][v]$.
Where:
l—is a number of teaching action;
i—is a number of testing action;
v—is a number of performance pattern extended with a case of unrecognizable performance of learner (that is considered as a faulty performance);
k—is a interpretation modality index having value: effect, background, causes;
k=m=1 means cognitive effect of learner's v-th performance predefined by the author;

k=m=2 means background of learner's performance learner's v-th predefined by the author;

k=m=3 means possible causes of learner's v-th performance predefined by the author;

k=4 means full-scale cognitive effect of learner's performance automatically calculated by the system for l-th or i-th training action;

k=5 means full-scale background of learner's performance automatically calculated by the system for l-th or i-th training action;

k=6 means full-scale possible causes of learner's performance automatically calculated by the system for l-th or i-th training action.

Media Database. The media database comprises for each course/unit:

Course properties (how to display it);
Pre-test media;
Introduction media;
Post-Test media;
Conclusion media;
Units flowchart media (how to display the flowchart);

Within each unit:
Unit media data:
  Unit properties (how to display)
  Pre-test media;
  Introduction media;
  Post-Test media;
  Conclusion media;
  Objective flowchart media (how to display the flowchart);
  Objective properties (how to display)
  Cognitive items flowchart media (how to display the flowchart);
  Cognitive item properties (how to display)
  Training actions library:
    Tutor commands Library (for injection into the Domain Module) with type of communication to use with Domain Module;
    Tutor's Message Library (for presentation to a learner) with type of communication to use with learner;
  Learner control actions library (for injection into the Domain Module);
  Domain situation patterns Library/Simulation (for recognition);
  Performance/Response patterns library (for a recognition);
  Tutor comments library (to comment on the learner's performance, intentions).

The tutor commands library (above) keeps all necessary control actions of the Tutor to control the Domain Module. In the authoring stage, the author should predefine all these actions to the Domain Module. The library supports data entry and editing as well.

In the learning/training stage, the library provides a source of commands of the Tutor Module to control over Domain Module.

In the Tutor Message library, each message represents a partial case or a part of the training action that is being given to the learner directly through the tutor's window. The meta description of the message is in the training action library; but the media presentation of all messages is collected separately in the message library. This library, which is prepared by the author, provides a media form of introductions, explanations, hints, tasks posing, and conclusions to the learner within the course unit. Initially, the message library contains domain-independent message templates, which can be extended and specified by an author at will.

The control actions library keeps all possible control/navigation actions of the learner in domain and tutor's windows within the course unit. In the authoring stage, the author should predefine all these actions of learner. The control library supports data entry and editing as well. In the learning/training stage, the library provides control patterns for learner's control actions recognition.

The tutor's situation patterns library keeps patterns that are necessary for a current domain situation recognition. In the authoring stage, the author should predefine all these patterns on the basis of the available Domain Module. The library supports data entry and editing as well. In the learning/training stage, the library provides a source of media patterns for domain situation recognition.

The tutor's performance/response patterns library keeps patterns that are necessary for the learner's task performance recognition. In the authoring stage, the author should predefine all these patterns. The library supports data entry and editing as well. In the learning/training stage, the library provides a source of media performance/response patterns for learner's task performance recognition.

The comment library, which is prepared by the author, provides a media presentation of the tutor's direct reaction (such as confirmation, encouragement, . . . ) on the learner's performance and intentions within the course unit. So, each performance comment should be tailored to a particular performance pattern or its absence, predefined in the behavior predictive model. Initially, the comment library contains domain-independent comments, which can be extended and specified by author at will.

Learners database. Learners database provides the Tutor Module with the learners' personal data (which are not included in the audience database). This is a standard database, which is compatible with computer platform, operational system, and software environment of the system.

The learner database includes the following main record fields:

Registration data of the learner defining at least his/her ID, Name, User name, Password (and may be: Sex, Age, Affiliation, . . . )

Domain-independent data of the learner defining
  Stable properties to take into account including
    Personal preferences:
    Personal learning Style (for instance: verbal, visual, kinesthetic);
  Unstable capabilities to adapt training including
    Current mastery of prerequisite courses/units;
    Current difficulty/granularity level;
    Current control level.
Dynamic features to maintain:
  Learner Attention;
  Learner Intentions;
  Learner Motivation.
Domain-dependent data of the learner defining for each course the following records:
  Current status of course learning (not permitted, permitted, ready, not attempted, browsed, delivered, incomplete, completed, failed, passed);
  For each unit within the course defining:
    Current status of a unit learning (not permitted, permitted, ready, not attempted, browsed, delivered, incomplete, completed, failed, passed);

For each objective/cognitive item within the unit, a personal assessment of

MB[j]—assessment of expected mastery of j-th knowledge/skills item;

MU[j]—assessment of demonstrated mastery of j-th knowledge/skills item;

MBOD[J]—assessment of knowledge/skills item mastery suspected to be a single cause of errors made;

MBDN[J]—assessment of knowledge/skills item mastery suspected to be one of multiple causes of errors made (the negative part only);

MDEF[j]—assessment of knowledge/skills item mastery suspected to be on e of multiple causes of errors made;

MI[j]—Membership of item to "start line". (It is not stored in learner database);

MT[j]—Membership of item to "stop line". (It is stored in learner database);

MH[j]—Membership of item to a set of necessary items to learn. (It is not stored in learner database);

P[j] is a weight of item in tutoring path taken;

MFLTR[l] is a teaching action filter value;

MFLTR[i] is a testing action filter value;

PrMFLTR is a previous value of a training action filter

Figures 10, 11:
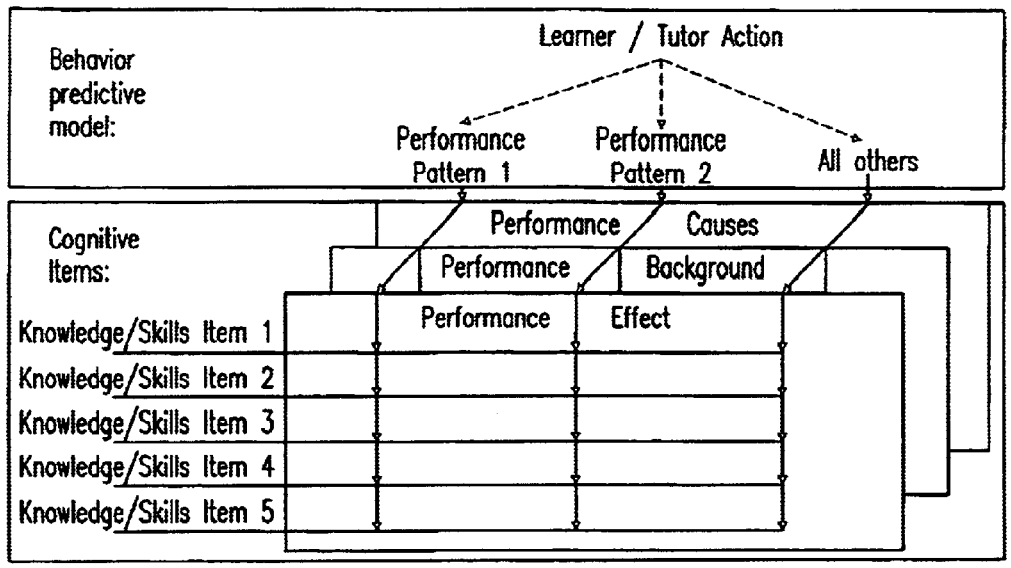
FIG. 10 is a conceptual diagram which illustrates the cognitive interpretation model according to the invention.
FIG. 11 shows an example of the author's interface to enter the cognitive interpretation model.

An example of a cognitive items assessment display is shown in FIG. 10.

Figure 12:
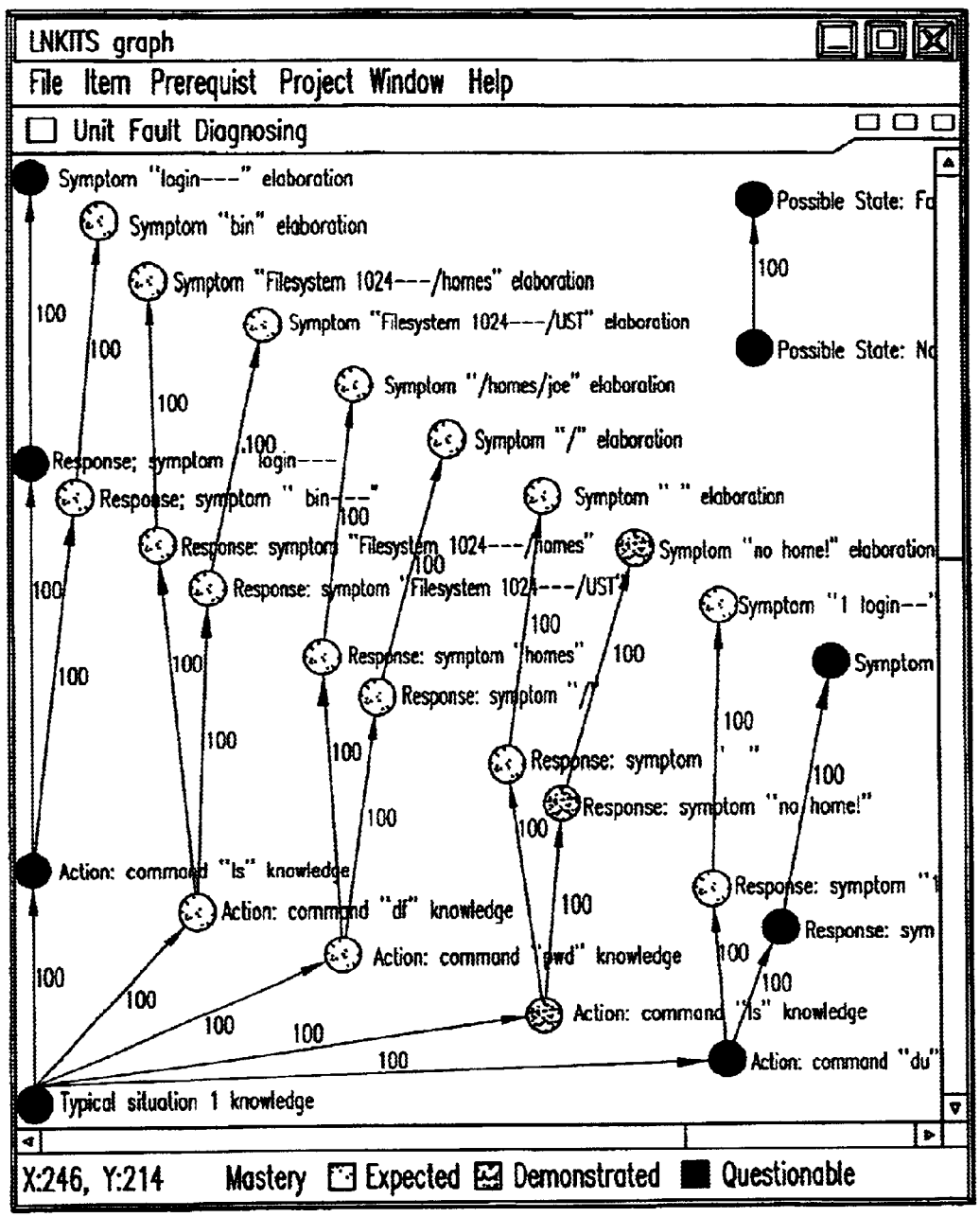
FIG. 12 depicts a particular example of a fuzzy graph according to the invention, which embodies a learner's interface to present cognitive items assessment and a focus of the next training action in a particular domain.
Figure 13:
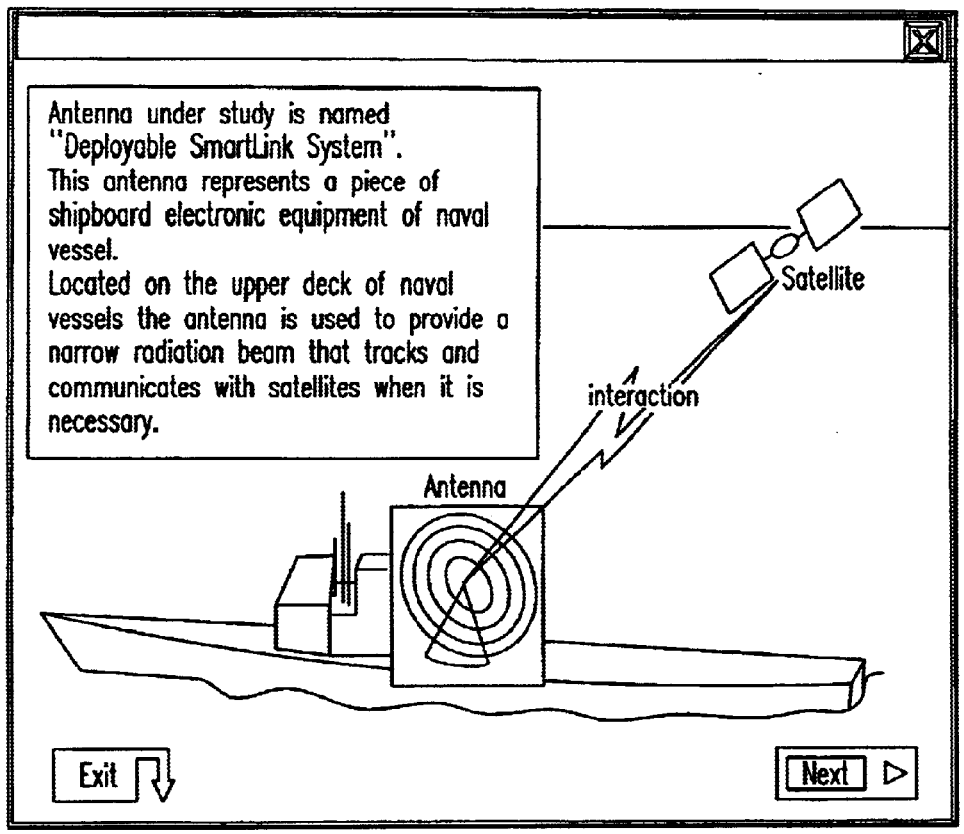
FIG. 13 is an example of domain content presentation to the learner in the system according to the invention.
Figure 14:
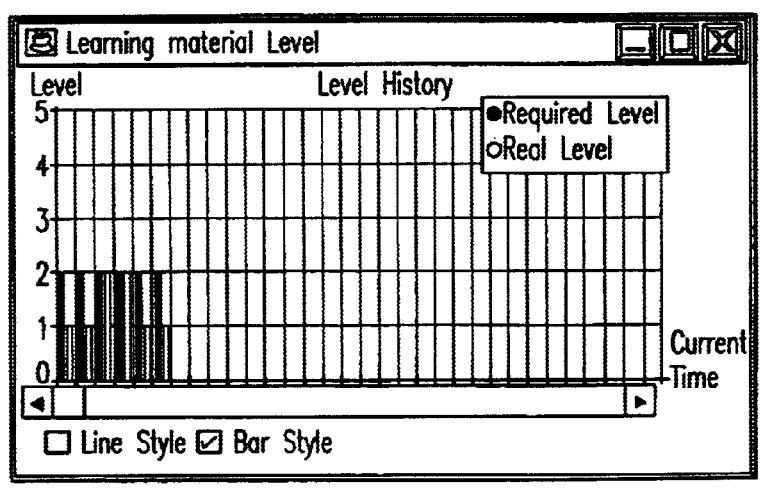
FIG. 14 is an illustration of an interface screen which shows the system adaptation of difficulty level according to the invention.

The current assessment of learner's knowledge/skills is represented to the learner for his/her inspection. It represents his/her knowledge/skills progress and deficiency, which serves as a deep-level feedback to learner from the system to support his/her self-driven learning. As shown, for example, in FIG. 12, which depicts a particular embodiment of the fuzzy graph in a particular domain, the nodes (vertices) of the fuzzy graph represent the items to be learnt and the arcs represent dependency relationships. Associated with each arc is a number between 0 and 100 representing the author's structuring the degree of dependency he/she thinks exists between vertices connected by the arc. (In FIG. 12 all such numbers are shown as 100. In practice, however, these numbers would vary between 0 and 100, as noted.) Thus a number of 50 between two nodes indicates that the item represented by the first node needs to be mastered only partly in order to master the item represented by the second node. When a presentation is shown relating to a particular node or a set of nodes, this is tracked by the engine and the nodes are marked "shown, mastery expected". The level of difficulty or "granularity" of the material presented by the items is also noted, in terms of level of difficulty required and actual level of material available for instruction for that item. (Thus associated with each node is tutoring material at a few different levels of difficulty as shown in FIG. 14.) When questions are answered correctly or actions taken correctly, the nodes covered by those answers/actions are marked "mastery demonstrated". However the mastery may not rise to a score of 100 until later answers/actions are recorded correctly. When an error is made at some node, all prior nodes that relate to that error are marked "mastery doubtful, or suspect". The engine tracks and updates the state of the learner as depicted on the graph and directs the learner's navigating through the graph on his/her own individual path until mastery of the terminal learning objective is achieved.

The Tutor Module Player

The Tutor Player is a computer program realizing training functions by use of the Tutor Module database. It comprises the following components:

Behavior recognition;

Cognitive Interpretation;

Decision making;

Actions planning;

Actions generation;

Interface;

Runtime manager.

Figure 7:
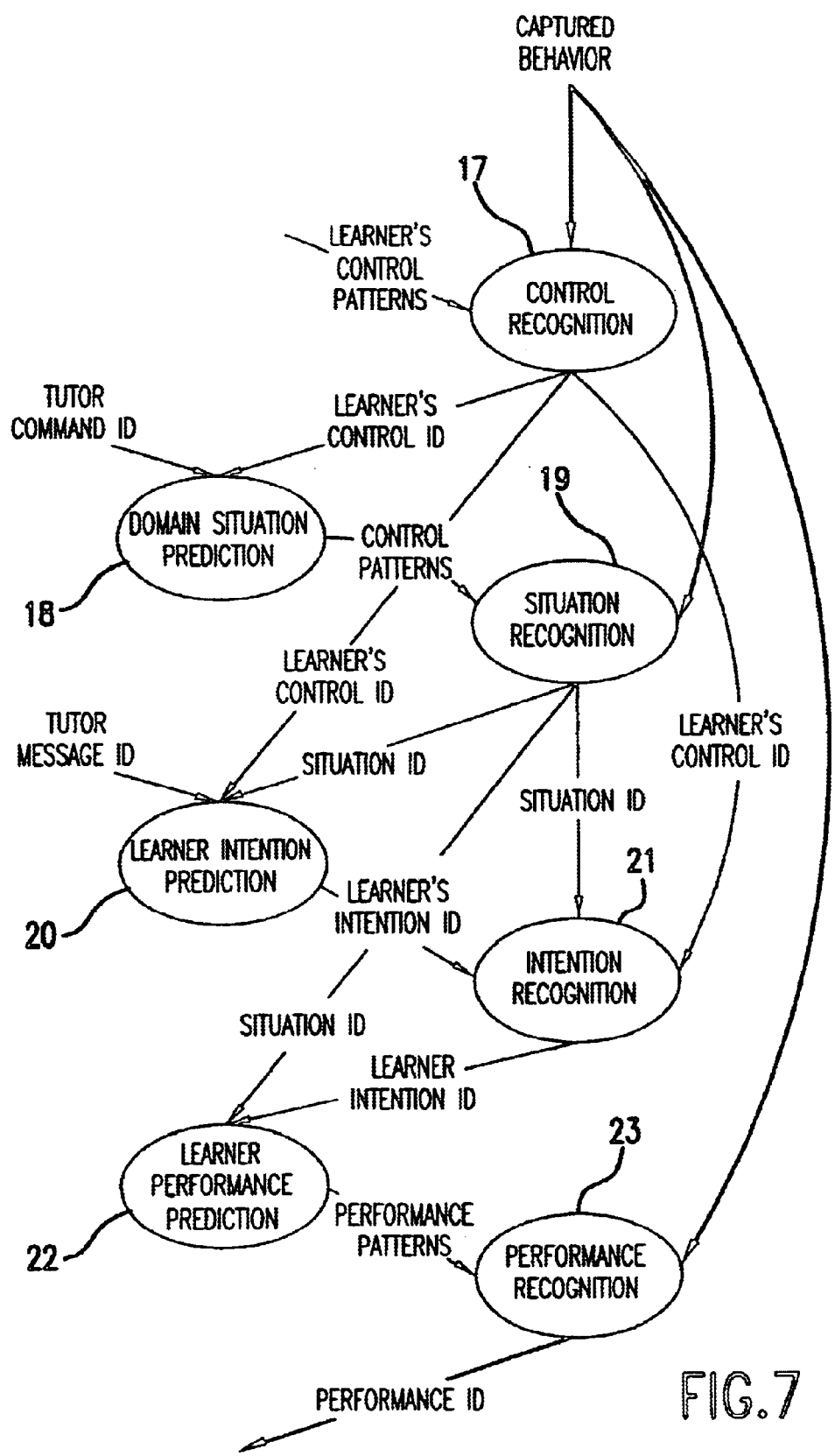
FIG. 7 is a conceptual diagram that illustrates the functional scheme of the behavior recognition component of the Tutor module.

Behavior recognition. The behavior recognition component is illustrated in FIG. 7. It uses the behavior recognition model pre-stored in the database and generates an output in the form of a learner's performance ID, based on the learner's response on a training massage, his/her control actions, the domain situation, and his/her performance data (captured by the Tutor Module from the Domain Module). In a simulated-based embodiment, the behavior recognition component consists of the following sub-components:

(1) Control recognition 17;

(2) Domain behavior prediction 18;

(3) Situation recognition 19;

(4) Learner intentions prediction 20;

(5) Intention recognition 21;

(6) Learner performance prediction 22;

(7) Performance recognition 23.

Operation of behavior recognition sub-component includes the following steps:

(8) In the authoring stage, establishing a recognition threshold;

(9) Definition of a specific patterns set as a basis for a recognition;

(10) In the learning/training stage, receiving captured data;

(11) comparison of captured data with predefined patterns and calculation of similarity score;

(12) Making a decision whether or not captured data is similar to one of the patterns available with predefined threshold.

(13) If Not, then continue observation;

(14) If Yes, generate the result of recognition in terms of the most similar pattern ID.

The functional progression of the subcomponents of the Behavior Recognition component is shown in FIG. 7.

Control recognition 17 is a fully automatic sub-component of the Tutor Module. No authoring is needed. All actions of a learner in the tutor window and/or the domain window are captured and compared with controls patterns predefined in tutor media database. The ID of the nearest pattern represents a recognition result, and is output as the learner's control ID.

The role of the domain situations prediction sub-component 18 is to provide a Domain situation pattern set for the following domain situation recognition, based on the training message ID; and the Learner's control ID. This function is realized automatically based on the intention model, in the following steps:

(1) running of domain behavior model;

(2) Input tutor's command ID;

(3) Input learner's control ID;

(4) Output generation of domain situation patterns.

Situation recognition 19 is a fully automatic component of the Tutor Module. The domain situation depends not only on the actions of the Tutor Module, but also on some uncontrollable learner's actions and domain pre-history. In general, the current domain situation tends to go beyond the tutor's control and needs tutor's efforts to bring it back under control. The domain situation recognition is a computer program, part of the Tutor Module, which provides this capability, based on the current situation captured by the Tutor Module from the Domain Module and situation patterns from the domain situation prediction.

The situation recognition component consists of a comparison part and a decision making part. The latter can include an adjustable parameter (a sort of threshold) to adjust necessary reliability of recognition.

The Learner intentions prediction sub-component 19 provides a pattern set for learner intention recognition. It generates learner intention ID's, based on the training message ID, the learner's control ID, and the Domain situation ID. This function is performed automatically on the basis of learner intention model in following steps:

(1) running of learner intention model
(2) Input training message ID;
(3) Input domain situation ID;
(4) Input learner's control action ID;
(5) Output generation of learner's intention ID.

Intention recognition 21 is also a fully automatic component of the Tutor Module. The learner intentions depend on tutor's messages, domain situations, but also on some uncontrollable learner's actions and domain pre-history. In general, the current domain situation tends to go beyond the tutor's control, and needs tutor's efforts to bring it back under control. The intention recognition 21 is a computer program which provides this capability. It generates an output in the form of a learner intention ID, based on the learner's control action IDs pre-recognized and Domain situation IDs pre-recognized.

It consists of comparison part and decision making part. The latter can include an adjustable parameter to adjust necessary reliability of recognition.

The Learner performance prediction sub-component 22 provides a pattern set for the following learner performance recognition, based on the Learner's intention ID and the Domain situation ID. A learner performance prediction is realized on the basis of the learner behavior model by the following steps:

(1) running of learner performance model;
(2) Input situation ID;
(3) Input learner's intention ID;
(4) Output generation of learner's behavior patterns Performance recognition 23 is a fully automatic component of Tutor Module. In any domain situation, the learner can behave by following his/her own intentions. In order to understand better what and how learner is doing, the Tutor Module needs to know a domain situation and an intention of a learner in this situation. This task is solved by the performance recognition sub-component of the Tutor Module, which generates a Learner performance pattern ID, based on the Learner's actions in the tutor window and/or the domain window, and Performance patterns from Learner performance prediction sub-components.

This component consists of a comparison part and decision making part. The latter can include an adjustable parameter to adjust necessary reliability of recognition.

Here the index "v" (indicating the number of a behavioral pattern) is determined.

Cognitive Interpretation. Cognitive interpretation of learner's behavior provides an assessment of learner's current knowledge/skills based on the cognitive interpretation model (contained in the Meta database) and the learner's behavior ID pre-recognized.

Such cognitive interpretation includes the following steps:

(1) Generation of a conditional assessment of cognitive items:
Running cognitive interpretation model;
Input learner behavior ID into the cognitive interpretation model;
Output generation of conditional assessment of cognitive items by this model.
(2) Retrieval of the current assessment of the learner's cognitive items from the learner database;
(3) Calculation of new assessments by:
Combining of the assessment of expected cognitive items MB[j] with conditional assessment of expected cognitive items DM[3][l][j][v].

$$MB[j]=MB[j]+DM[3][l][j][v]-MB[j]*DM[3][l][j][v]/100;$$

Combining of the assessment of demonstrated cognitive items MU[j] with author's conditional assessment of demonstrated cognitive items OM [2][i][j][v]. MU[j]=MU[j]+OM [2][i][j][v]−MU[j]*OM [2][i][j][v]/100;
if for any item the assessment of expected cognitive item MB[j]happens to he less then assessment of demonstrated cognitive item MU[j], then expected assessment MB[j] is made equal to demonstrated one MU[j]. MB[j]=Max (MB[j]: MU[j]);
Intersection of the assessment of cognitive items single deficiency MBOD[j] with author's conditional assessment of suspected cognitive items OM[2][i][j][v];
MBOD[j]=MBOD[j]*(100−OM[2][i][j][v])/100 (for correct part of performance);
MBOD[j]=(MBOD[j]+OM[3][i][j][v])*(100−OM[2][i][j][v])/100. (for incorrect part of performance);
MBOD[j]=MBOD[j]*OM[2][i][j][v]/100. (for unexpected=incorrect performance).
Combining of the assessment cognitive items multiple deficiency with author's conditional assessment of suspected cognitive items.

$$MDEF[j]=MBDN[j]*(100-MU[j])/100.$$

(4) Replacing of all current assessments with new ones in the learner database.

In more detail the whole procedure of an assessment calculation looks like:
For teaching type of training actions:

$$MB[j]=MB[j]+DM[3][l][j][v]-MB[j]*DM[3][l][j][v]/100;$$

For testing/diagnosing type of training actions:
For Correct expected part of performance $$MU[j]=MU[j]+OM[2][i][j][v]-MU[j]*OM[2][i][j][v]/100;$$

$$MBOD[j]=MBOD[j]*(100-OM[2][i][j][v])/100;$$

$$MB[j]=\text{Max}(MB[j], MU[j]);$$

For incorrect expected part of performance $$MBOD[j]=(MBOD[j]+OM[3][i][j][v])*(100-OM[2][i][j][v])/100;$$

$$MBDN[j]=MBDN[j]+OM[4][i][j][v]-MBDN[j]*OM[4][i][j][v]/100;$$

For Unexpected=Incorrect performance $$MBOD[j]=MBOD[j]*OM[2][i][j][v]/100;$$

$$MEDN[j]=MBDN[j]+OM[2][i][j][v]-MBDN[j]*OM[2][i][j][v]/100;$$

In any case $$MDEF[j]=MBDN[j]*(100-MU[j])/100.$$

A learner model includes a set of the following sub-models:

1. Learner behavior model:
   Learner intention model;
   Learner performance model;
2. Learner database items;
3. Multi-modal fuzzy relation (conditional assessment) of learner database items with learner's performance;
4. Multi-modal fuzzy assessments of learner's database items (this is traditional "overlay learner model").

Decision making. The decision making component of the Tutor Module Player is a computer program (a part of Tutor Module), which simulates decision making activity of a tutor and provides all necessary training decisions on the basis of a current assessment of the learner's cognitive items, objectives, strategy, and style parameters predefined by the author for the course unit.

This is a fully automated component of the Tutor Module. No authoring needed, but adjusting and tuning is possible.

The functionality of decision making component is as follows:
Input:
  Current cognitive items assessment from the learner database or the cognitive interpretation component;
  Course metadata from the tutor meta database;
  Unit metadata from the tutor meta database;
  Training objectives metadata from the tutor meta database;
  Modes available in the course/unit from the tutor meta database;
  Style parameters from the tutor meta database;
  Learner control actions over the Tutor Module (selection of course, unit, objectives, state, Start-Stop conditions, mode);
  Current state (passive, active);
  Current mode (pre-test, instruction, practice, remediation, post-test)
  Current sub-mode (Delivery, Testing, Diagnosing)
Result: Training Decisions:
  Set the Tutor Module in a particular state, mode, sub-mode:
    Passive state;
      No intervention;
      Commenting;
      Advising;
    Active state:
      Set a mode:
        Set a Pre-test;
        Set a Instruction:
        Set a Practice;
        Set a Remediation;
        Set a Post-test;
      Set a sub-mode:
        Set a Delivery;
        Set a Testing;
        Set a Diagnosing;
      Set a difficulty level;
      Set a control level;
    Define global sufficiency of the training mode;
    Define "Start-Stop" Sufficiency of the training mode;
    Define local sufficiency of the training mode.

Figure 8:
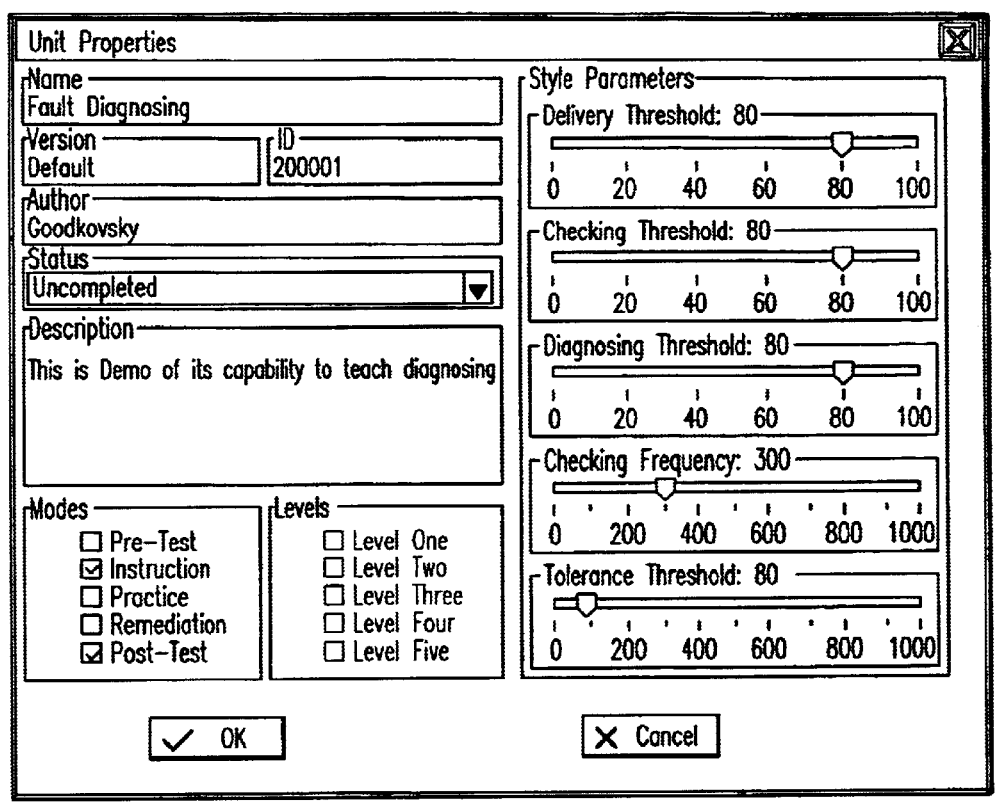
FIG. 8 illustrates an example of the author's interface for the entry of unit properties.
Figure 9:
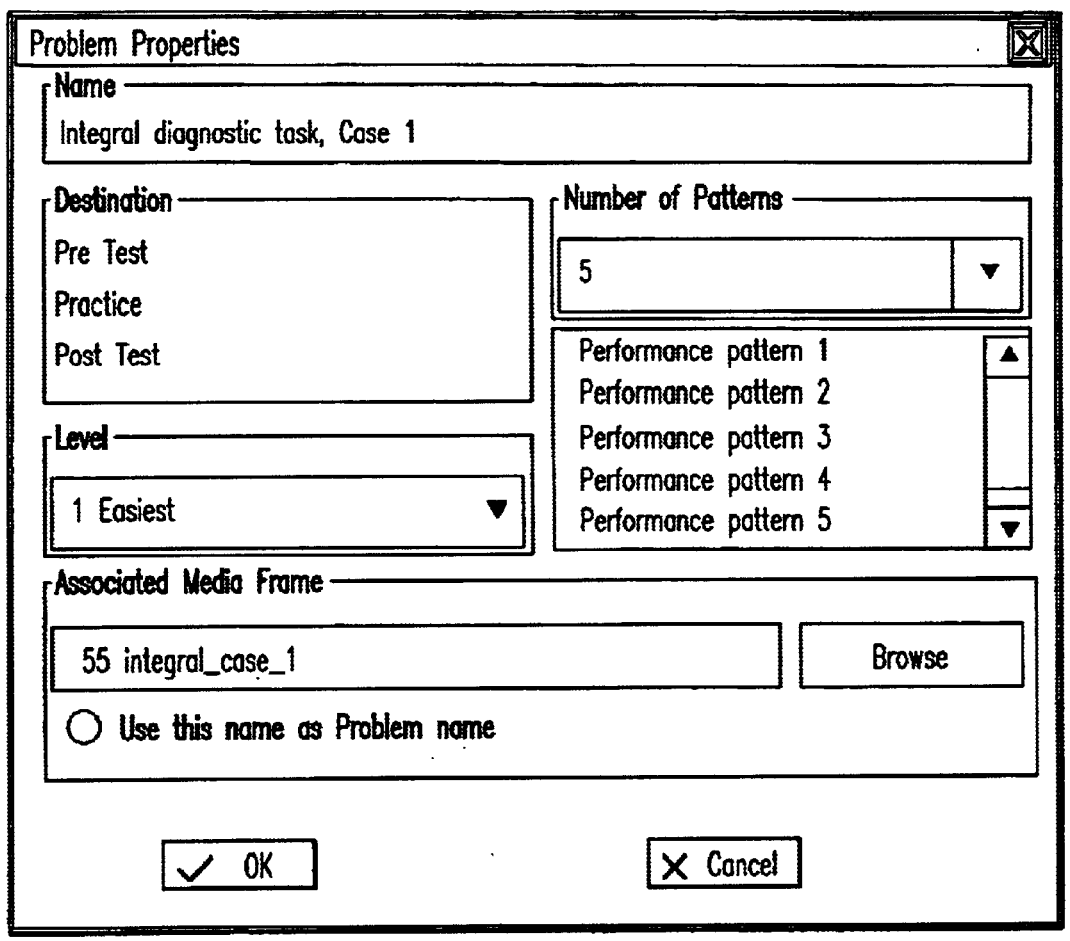
FIG. 9 illustrates an instance of the author's interface for training (testing) action properties with embedded behavior (performance) prediction model.

The training style of the system is flexible and the author can modify it at will. It is predefined by several variable parameters, which the author can set at the authoring stage, via an input window such as is shown in FIG. 8, by specifying the following information.

Delivery Threshold. Defines how thoroughly author wants the system to deliver new knowledge and skills to learners. The Delivery Threshold is defined as a percentage from 0 to 100. When the author sets the value higher, the system becomes more "persuasive", and may repeat content presentation more often to confirm the same knowledge and skill items. When the author sets this value lower, the system presents content less thoroughly and more superficially.

Testing Threshold. Defines how thoroughly the author wants the system to check newly delivered knowledge/skills. The Testing Threshold is defined as a percentage from 0 to 100. When the author sets the value higher, the system will be more demanding, quizzing the learner more often to evaluate mastery; when the author sets this value lower, the system becomes more trusting and superficial.

Diagnosing Threshold. Defines how thoroughly the author wants the system to diagnose the causes of learner mistakes. The Diagnosing Threshold is defined as a percentage from 0 to 100. When the author sets the value higher, the system becomes more precise and exact, diagnosing frequently by using more questions; if overdone, this may prove annoying to the learner. On the other hand, when the author sets the value lower, diagnosis may be superficial or wrong; consequently, remediation may be redundant and annoying.

Delivery/Testing threshold. Defines how often the author wants the system to check newly delivered knowledge/skills. This threshold is expressed in integers from 0 to 1000, with each knowledge/skill item having a standard value of 100. Thus, if the threshold is set to 100, the system will check each new knowledge/skills item after it is delivered, at 200 every two delivered item will be checked, and so on. When the author sets this value at a higher level, corresponding to more knowledge/skills items, the system will deliver more knowledge/skills items before beginning to check their mastery. In this case the knowledge/skills assessment will be updated less often, meaning less individual adaptation, but more freedom for the learner. When the author sets the Delivery/Testing threshold lower, the control over learning is stronger, the assessment is updated more often, providing a higher degree of adaptation to the individual learner, but also less freedom for the individual learner to control his or her own pace and progress. This parameter defines a control level, in the other words.

Tolerance Threshold. Defines the system's tolerance to learner mistakes without interrupting the learning process. The Tolerance Threshold is measured in integers from 0 to 1000, with each error having a standard value of 100. Thus, when the Tolerance Threshold is set at 100, the system will interrupt delivery after detecting at least one error and begin to remedy it. Setting the value at 200 tolerates two errors without interruption, and so on. The higher the value, the more errors the system will allow before entering remediation; the lower the value, the fewer errors will be allowed.

Difficulty Range. Defines a diversity of difficulty levels an author wants a system to realize in audience training. (See FIG. 14.)

Difficulty switching threshold. Defines how much evidence an author wants a system to accumulate for switching a learner to the next difficulty level. This parameter thus defines the degree of inertia of the system in the decision to switch to the next level of difficulty.

Post-testing threshold. Pre-defines how thoroughly an author wants a system to post-test learners. It can be taken from the course order specification.

One of the roles of the decision making component is Training Mode administration. It includes the following steps:

(1) If an author predefined a pre-test, then the Tutor Module begins from the pre-test, and all other modes are unavailable for a learner's choice. (Self-driven learning and passive training is always possible). Only after the learner has passed pre-test successfully, all other modes become available for a learner's choice in the Tutor Module.

If the pre-test has not been passed, then the learner is advised which prerequisite course/units/items to learn;

If the pre-test has been passed (learner is ready for the course unit), then the Tutor Module presents to learner a menu to choose from: instruction, practice, remediation, and post-test (self-driven study is always possible), whichever has been provided for the current course unit by the author;

(2) The learner makes his/her choice;

(3) If the learner's choice was a post-test, then the post-test is administered;

If the learner passed the post-test, then active training of the course unit is over;

If the learner did not pass the post-test, the Tutor Module returns the learner to step (3) and recommends him/her certain mode for choice;

(4) If the learner's choice was the instruction ("teach me"), then the instruction is realized;

(5) If the learner's choice was the practice ("exercise me"), then the practice is realized;

(5) If the learner's choice was the remediation ("remediate me"), then the remediation is realized.

Actions Planning. The training actions planning component is a computer program which simulates the capability of a human-tutor. Simply speaking the component defines which training action to execute next. This is a fully automated component, no authoring is needed, but adjusting is possible.

The planning function is as follows:

Input:

objectives from the tutor meta database;

Strategy from the tutor meta database;

Training mode (pre-test, instruction, practice, remediation, post-test) from decision making component;

Sub-mode (delivery, testing, diagnosing) from decision making component;

Sub-mode style from the tutor metadatabase;

Adaptive tactics of sub-modes from the tutor metadatabase;

Style parameters (threshold set) from the tutor metadatabase;

Domain behavior model from the tutor metadatabase;

Learner behavior model from the tutor metadatabase;

Cognitive interpretation model from the tutor metadatabase;

Learner's personal data from the tutor's learner database;

Start-Stop conditions;

Current assessment of learner's knowledge/skills;

Current values of difficulty and control level;

Personal preferences and learning style of learner;

The previous training/learning actions;

Output: ID of the next training action to generate for an execution.

Planning is different for different modes (pre-test, instruction, practice, remediation, post-test), sub-modes (delivery, checking, diagnosing), and sub-mode styles (batch, linear, branching, and adaptive/intelligent).

For adaptive style of sub-modes there are different tactics as well. The author can predefine the Delivery tactics by selection from the list offered by the system in authoring stage:

Breakthrough to the terminal objectives is the first thing to do (Challenging, risky tactics);

Providing a general background is the first thing to do (Guarded, safe tactics);

Provide minimally necessary background for the next step on the way to the current objective (by default).

The author can predefine the Testing tactics by selection from the list offered by the system in authoring stage:

The first items delivered—the first checked;

The last items delivered—the first checked;

The maximal coverage of delivered items—the first.

The author can predefine the Diagnosing tactics by selection from the list offered by the system in authoring stage:

The closest causes—the first to check;

The deepest causes—the first to check;

The maximal distinguishing of suspected causes—the first to try.

By default the system selects the last tactics (above) automatically in each case.

Realization of the last (most efficient) tactics for all sub-modes (delivery, testing, diagnosing) comprises the same steps:

Filtering;

Weighting;

Selection.

Filtering allows exclusion of obviously inappropriate training actions from consideration, and this reduces the dimension of the planning problem. This is a strict pre-selection. Weighting on the other hand means evaluation of current pedagogic power of remaining training actions. (This is a soft pre-selection.) Finally, selection is a final decision of what to select from remaining and weighted training actions.

Planning of adaptive delivery (teaching) selects a next teaching action and includes the following steps:

(1) Filtering of training actions to reduce the scope of the planning task;

(2) Weighting of training actions;

(3) Selection of the next training action.

Teaching actions filtering represents a first (strict pre-selection) step of an adaptive delivery planning and in turn includes the following sequence of sub-steps:

1. rejection of teaching actions with properties (target mode) that are inappropriate to current training mode;

2. rejection of teaching actions with start-stop conditions that are inappropriate to current domain situation;

3. rejection of teaching actions which deliver knowledge/skills (expected) outside of learner's current concern expressed him in the training boundaries (zone) predefined;

4. rejection of teaching actions for which current difficulty level is higher then personal level of the learner;
5. allowing teaching actions that will be able to remedy currently suspicious knowledge/skills items;
6. rejection of teaching actions that are not able to contribute in learner's progress (in non-mastered (non-demonstrated) yet cognitive items within training boundaries and the nearest zone of delivery before mastery checking); and
7. rejection of teaching actions that are not grounded on delivered (expected) or mastered (demonstrated) cognitive items.

Figure 15:
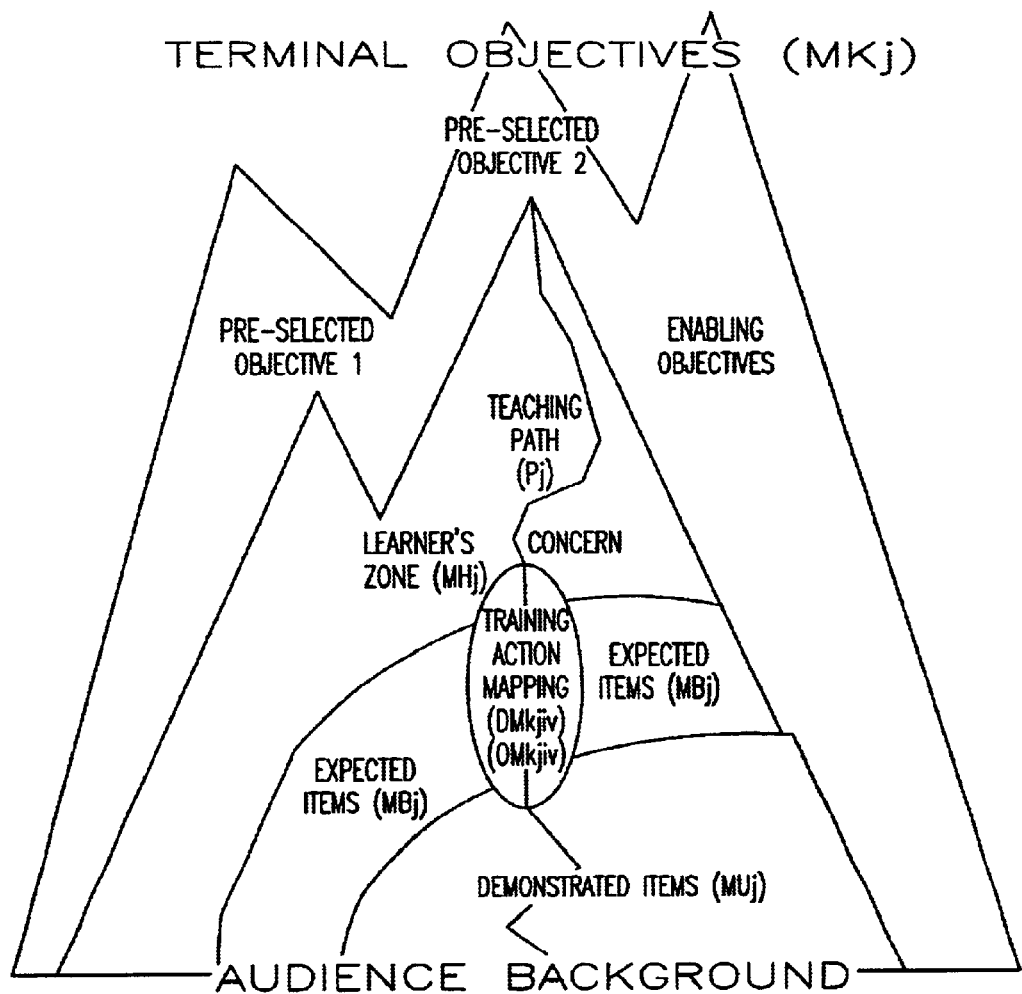
FIG. 15 is a diagram which illustrates the mapping of a training action into cognitive items in the system according to the invention.

An illustration of teaching action mapping into cognitive items is shown in FIG. 15.

Teaching actions weighting is a second (soft pre-selection) step of an adaptive delivery planning and includes a sequence of the following rules in a weight calculation:

1. The more a teaching action is capable of contributing to new cognitive items delivery, the more weight it will have;
2. The more a teaching action continues the path to the objective predefined by previous training actions, the more its weight will be;
3. The more a teaching action matches the preferences and learning style of the learner, the more weight it will have.

$$Power(l) = Fltr(l) * \Max_{j=0,1,\ldots Jm}\left[(DM\ 4jlVm+1)*(100-MBj)*MH(j)*\sum_{h}^{Jm} Ph*PM2jh\right]$$

wherein:
Vm=number of total performance patterns
Ph=assessment value of learning on the tutoring path, initially set to 100 and updated during presentation.

Teaching action selection is a concluding step of delivery planning and includes a sequence of the following sub-steps:
1. select training actions with maximum weight $$L = arg\Max_{l} Power(l);$$

2. select a training action with maximum level of difficulty, which previously has been adaptively limited by a system for the learner.

Adaptive testing planning includes the following steps:
(1) Filtering of testing actions;
(2) Weighting of testing actions;
(3) Selection of testing actions.

Testing actions filtering represents a first (strict pre-selection) step of adaptive testing planning and includes a sequence of the following sub-steps:
(1) rejection of testing actions with properties (target mode) that are inappropriate to current training mode. (Only appropriate testing actions remain after that);
(2) rejection of testing actions with start-stop conditions that are inappropriate to current domain and training situation;
(3) rejection of testing actions that lie entirely outside of the predefined training boundaries;
(4) rejection of testing actions that cannot check cognitive items unchecked yet within the predefined training boundaries;
(5) rejection of testing actions presented before;
(6) allowing testing actions that cover delivered/expected cognitive items within the predefined training boundaries;
(7) If this is a remediation mode, then
scanning and passing of testing actions that are related to suspicious or reliably demonstrated cognitive items;
scanning and passing of testing actions that are inside suspicious cognitive items;
scanning and passing of testing actions that are related to suspicious cognitive items;
(8) rejection of testing actions that are not reliably grounded on demonstrated cognitive items;
(9) passing of testing actions that cover reliably delivered cognitive items within the predefined training boundaries;
(10) rejection of testing actions with difficulty level higher then learner's current (maximal) level of difficulty.

An illustration of testing action mapping into cognitive items is shown in FIG. 15.

Testing actions weighting represents a second (soft pre-selection) step of adaptive testing planning and includes a sequence of the following rules in a weight calculation:
(1) The more the testing action covers unchecked or ill-checked knowledge/skills items within the predefined training boundaries, the more weight it will have;
(2) The more the testing action covers the most expected knowledge/skills items within the predefined training boundaries, the more weight it will have;
(3) The more the testing action covers the path of previous training actions within the predefined training boundaries, the more its weight will be.
(4) The more the testing action matches the preferences and learning style of the learner the more its weight will be.

$$Power(i) = Fltr(i) * \sum_{j}^{Jm-b} MHj*(100-MUj)*MBj*Pj*OM\ 2jiVm+1$$

Testing action selection is a concluding step of adaptive testing planning and includes a sequence of the following sub-steps:
(1) selecting testing actions with maximum weight;
(2) selecting testing action N with maximum level of difficulty adapted for the learner individually.

$$N = arg\Max_{i} Power(i)$$

Adaptive diagnosing planning includes a cycle of the following steps:
(1) Diagnosis readiness check-up.
If Yes, then diagnosis posing and stop;
If Not, then continue;
(3) Diagnosing search;
(4) Return to (1).

Diagnosing search represents a core of adaptive diagnosing planning and includes the following steps:
1. Filtering of diagnosing actions;
2. Weighting of diagnosing actions;
3. Selection of the next diagnosing action;

4. Realization of the selected diagnosing action;
5. Monitoring of learning with a cognitive assessment.

Diagnosing actions filtering is a first (strict pre-selection) step of diagnosing search and includes a sequence of the following steps:
1. rejection of diagnosing actions with start-stop conditions that are inappropriate to current domain and training situation;
2. rejection of diagnosing actions that cover only demonstrated knowledge/skills items;
3. rejection of diagnosing actions presented before in current search pass;
4. rejection of diagnosing actions that relate to unexpected or unsuspicious knowledge/skills items.

Diagnosing actions weighting is a second (soft pre-selection) step of diagnosing search including a calculation of a current power of diagnosing action $$Power(i) = Fltr(i) * \sum_{s}^{Sm} \sum_{j}^{Jm} \sum_{r=j+1}^{Jm} |MNjis - MNris| * (MBODj + MBj) * (MBODr + MBr);$$

Or in a recursive form:

Sum=Sum+Math.abs($MN[i][j][s]$-$MN[i][r][s]$)*($MBOD[j]$+$MB[j]$)*($MBOD[r]$+$MB[r]$);

A diagnosing action selection is a concluding step of diagnosing search and in the most simple embodiment it selects a testing action with maximal Power (i)

$$N = arg\operatorname*{Max}_{i} Power(i);$$

Training Actions Generation.

As a rule training actions do not exist in a form ready to be implemented. It wastes system's memory. When a time delay is not critical, then it is better to generate them when it is necessary. In one embodiment, it is possible to assemble training actions from pre-stored set of building blocks (such as templates, backgrounds, text windows, different kind of buttons, hot spots, and menus). In other embodiment, content of training actions can be automatically generated from a formal presentation of a domain under study, such as semantic networks, decision tables. In simulation-based embodiment, training actions can have a form of a command triggering certain processes and causing certain situations in the Domain Module.

Runtime manager with a timer. Runtime manager with a timer provides a synchronized interaction of all tutor domain components.

Generic System Architecture

Figure 16:
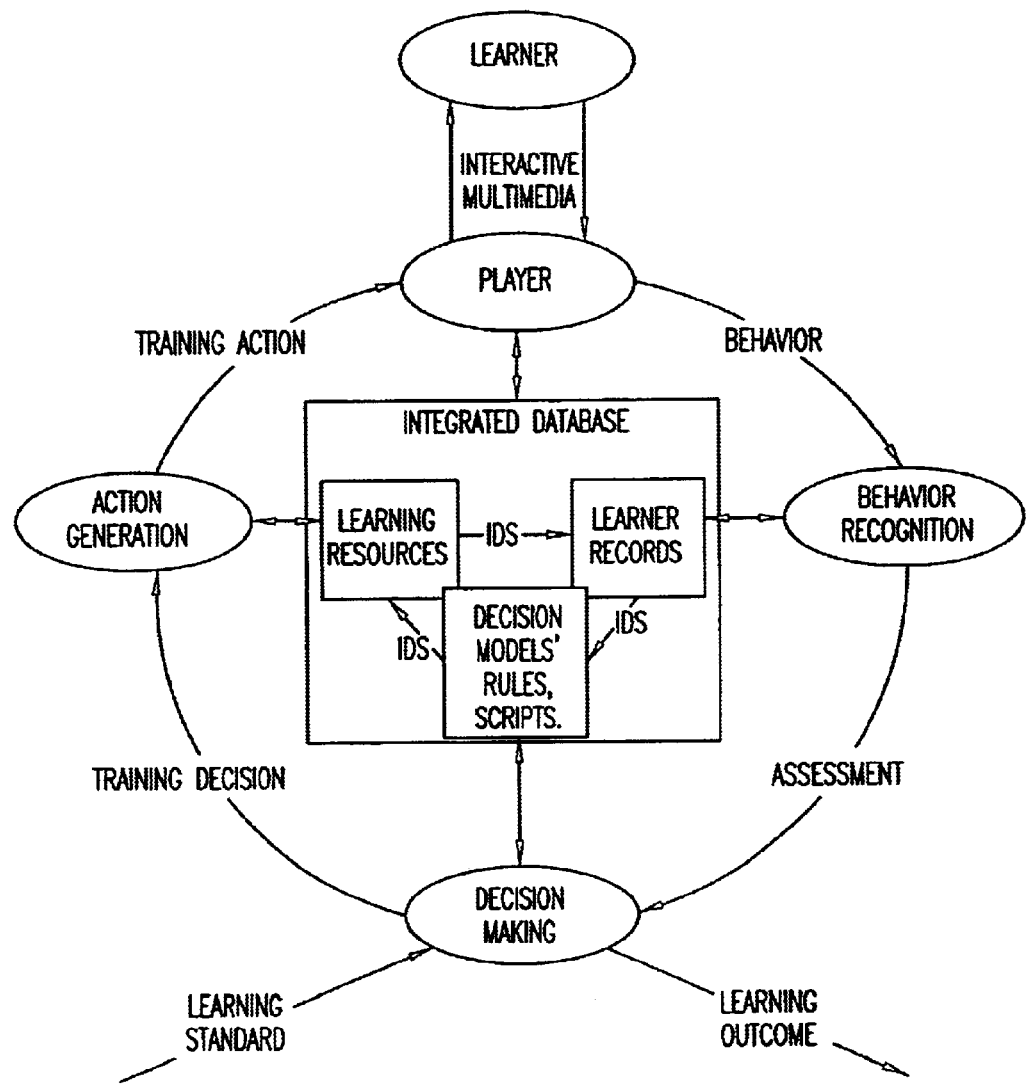
FIG. 16 shows the generic system architecture.

A conceptual diagram of the generic system architecture is represented in FIG. 16. In this architecture all above-mentioned databases are combined into one integrated database. The generic player includes the domain player and the tutor-learner interface. The generic decision making component includes interpretation, decision making, and planning components of the Tutor Module.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An intelligent tutoring system for adaptive training of a learner in a domain comprising a field of knowledge, said tutoring system comprising:
   a computer having an input for entry of information, a memory for storing information, a CPU for executing programs and an output for presentation of results of execution of a program; and
   a computer readable memory encoded with a program for causing said computer to perform interactive training of said learner, said program including,
      a Domain Module containing information concerning the field of knowledge, to be conveyed to the learner; and
      a Tutor Module for simulating human-tutor training actions in testing, delivering information, practice and remediation for said learner using information selected and communicated from said Domain Module;
   wherein said Tutor Module dynamically adapts a sequence of said training actions and selection of said information from said Domain Module, to a current assessment of the learner's knowledge and skill level within the domain, utilizing principles of fuzzy logic.

2. An intelligent tutoring system according to claim 1, wherein adaptation of said sequence of training actions takes into account a level of difficulty of information to be presented and preferences and learning style of the learner.

3. An intelligent tutoring system according to claim 1, wherein said Domain Module comprises a reusable generic domain shell which is independent of said domain, for organizing domain data and interactive domain simulation.

4. An intelligent tutoring system according to claim 3, wherein said domain shell comprises:
   a domain database defining a generic domain structure adapted to receive entry of domain specific data;
   a domain player defining generic domain procedures; and
   an interface for communicating information to and from the learner, an author and the Tutor Module.

5. An intelligent tutoring system according to claim 4, wherein said domain database stores domain data, comprising:
   a plurality of domain objects adapted to interact with each other, with domain agents, with a learner and with the Tutor Module;
   a plurality of domain agents for solving specific tasks by interacting with each other, with domain objects, with a learner and with the Tutor Module; and
   an interface for communication of information among domain objects, domain agents, a learner and the Tutor Module.

6. An intelligent tutoring system according to claim 4, wherein the domain player comprises:
   players for objects and domain agents;
   a generic inter object interface to be filled in with specific interface from the domain database;
   a generic domain learner interface, to be filled in with specific interface from the domain database;
   a runtime manager; and
   a timer.

7. An intelligent tutoring system according to claim 4, wherein said Domain Module further comprises a domain authoring tool for supporting input of a domain specific data into the domain database.

8. An intelligent tutoring system according to claim 7, wherein said domain authoring tool comprises a plurality of media editors for entry and editing of existing domain content in media form.

9. An intelligent tutoring system according to claim 1, wherein said Tutor Module comprises a reusable model-based tutor shell which includes predetermined training paradigm/domain/learner-generic pedagogical knowledge and skills, which is adaptable to a particular audience of learners and to use with a particular Domain Module, by the entry of data by an author during an authoring phase.

10. An intelligent tutoring system according to claim 9, wherein said tutor shell comprises checking/prognosis/diagnosis based dynamic planning capability, which makes decisions concerning delivery of training actions, based on said predetermined knowledge and skills, and said data entered by said author.

11. An intelligent tutoring system according to claim 10, wherein said tutor shell comprises:
    a tutor database for defining and organizing a domain-independent generic tutor data structure and tutoring media data and metadata;
    a tutor player for defining generic tutoring procedural modes and for implementing tutoring simulation; and
    an interface for communication with an author, a learner and said Domain Module.

12. An intelligent tutoring system according to claim 11, wherein said tutor database comprises:
    an audience database for providing a knowledge of a target audience;
    a job/tasks database for supporting interaction with said author for training objective definition;
    a media database for storing information entered by the author to provide the Tutor Module with paradigm/domain specific pedagogical knowledge; and
    a learner database for storing information entered by the author for providing the Tutor Module with knowledge concerning specific learners.

13. An intelligent tutoring system according to claim 11, wherein said tutor player comprises:
    a behavior recognition component which compares actions of a learner entered via said interface, with predefined patterns, selects a closest match, and generates performance pattern ID's based on said closest match;
    a cognitive interpretation function for recognizing performance pattern ID's of a learner, using a cognitive interpretation model;
    a decision making component for making decisions about sufficiency of training in different learning modes, and deciding which training mode to enter next;
    an actions planning component for planning delivery of additional training actions; and
    an action generation unit for generating a next training action via said interface.

14. A method for adaptive training of a learner in a domain comprising a field of knowledge, using a computer having an input for entry of information, a memory for storing information, a CPU for executing programs and processing information, and an output for presentation of results of execution of a program and processing information, said method comprising:
    storing in said memory a Domain Module having a reusable generic domain shell which is independent of said domain for organizing domain data, and for interactive domain simulation;
    storing in said memory a Tutor Module having a reusable model-based tutor shell which includes predetermined training paradigm/domain/learner-generic pedagogical knowledge and skills, and which is adaptable to a particular audience and a particular domain through entry of specific data;
    entering domain specific, audience specific and learner specific data into said Domain Module and said Tutor Module, said audience comprising a group of prospective learners to be trained;
    said computer performing interactive training of said learner based on information selected and communicated from said Domain Module and said Tutor Module, according to instructions from said Tutor Module.

15. A method according to claim 14, wherein said Tutor Module dynamically adapts a sequence of training actions and selection of information from said Domain Module to a current assessment of the learner's knowledge and skill within the domain.

16. A method according to claim 15, wherein adaptation of said sequence of training actions takes into account a level of difficulty of information to be presented and preferences and learning style of the learner.

17. The method according to claim 15, wherein said adaptation is based on analysis of the learner's knowledge within the domain and an author entered hierarchical structure which includes a plurality of rules concerning prerequisites and degrees of mastery, based on an application of principles of fuzzy logic.

18. A method for adaptive training of a learner in a domain comprising a field of knowledge, said method comprising:
    providing a component including a hierarchically ordered set of data comprising units of domain information concerning said domain;
    providing a paradigm for delivery of said domain information to said learner according to a hierarchy of said set of data, said paradigm including a plurality of rules concerning prerequisites for each of said units of domain information, including mastery levels for other units of domain information; and
    dynamically adapting a sequence and manner of delivery to said learner of said units of domain information within said hierarchy, to a current assessment of the learners knowledge and skill level within the domain, based on an application of rules contained in said paradigm utilizing principles of fuzzy logic.

19. A method for operating a computer system for training a learner, the method comprising the steps of:
    storing a tutoring module and a Domain Module in said computer;
    associating the tutoring module and the Domain Module to obtain at least one learning paradigm having at least one training goal;
    providing for interaction by the learner with the Domain Module, said interaction including said computer delivering training actions to said learner, and said learner entering responsive actions into said computer;
    establishing a course for the learner comprising a sequence for delivery of training actions, based on the learning paradigm and the interaction by the learner; and
    modifying the course based on the interaction by the learner to achieve at least one training goal of the learning paradigm.

20. A method according to claim 19, wherein said step of modifying the course comprises dynamically adapting said sequence of training actions to a current assessment of the learner's knowledge and skill level within the domain, based on said responsive actions of the learner, using principles of fuzzy logic.

21. A method for instructing a learner using a computer, the method comprising the steps of:
providing a Domain Module associated with a Tutor Module thereby defining at least one training goal and at least one skill set related to each training goal via at least one teaching paradigm;
providing a learner interface to provide instruction and to allow the learner to interact with the Domain Module and the Tutor Module;
observing interaction between the learner and the Domain Module and the Tutor Module to obtain first interaction results;
comparing the first interaction results with the at least one skill set to obtain a skill level of the learner;
selecting a course of instruction based on the first interaction results and said at least one teaching paradigm;
providing active instruction to the learner based on the course of instruction;
monitoring the learner's actions during the active instruction to obtain second interaction results;
modifying the course of instruction based on the second interaction results until at least one training goal is met;
providing passive instruction to the learner based on the course of interaction; and
providing the learner with control over tutoring modes.

22. A method according to claim 21, wherein said step of modifying the course comprises dynamically adapting said sequence of training actions to a current assessment of the learner's knowledge and skill level within the domain, based on said responsive actions of the learner, using principles of fuzzy logic.

23. A method for operating a computer for training of a learner, the method comprising the steps of:
providing a Domain Module comprising media data;
providing a Tutor Module comprising at least one learning paradigm and at least one authoring tool, each learning paradigm associating media data of the Domain Module with at least one training objective and at least one skill set, each authoring tool defining for the Tutor Module a course module comprising audience data, job/task data, cognitive data, and training objectives, the audience data and cognitive data quantifying an educational goal, the course module being based on at least one relational association of course module elements to establish situated performance patterns;
providing the Domain Module data to the learner through an interface;
monitoring actions of the learner interacting with the Domain Module;
determining a level of knowledge of the learner for at least one skill set based on the actions of the learner interacting with the Domain Module;
selecting a training method based on the predicted level of knowledge of the learner;
generating at least one course module comprising a sequence of selected training actions, based on the level of knowledge of the learner;
providing instruction to the learner based on the course module;
monitoring progress by the learner through the course module;
identifying behavioral patterns of the learner during the progress of the learner through the course module;
updating the determined level of knowledge of the learner based on the identified behavioral patterns;
predicting a level of knowledge of the learner for at least one additional skill set based on at least one of the identified behavioral patterns, an associate of the skills sets, and the actions of the learner;
providing directed training of said course module based on the predicted level of knowledge of the learner for at least one additional skill set;
testing the level of knowledge of the learner to determine if at least one training goal is met; and
providing adjusted directed training through said course module until at least one training goal is set.

24. The method according to claim 23, wherein said step of providing adjusted directed training comprises dynamically adapting said sequence of training actions to the level of knowledge of the learner, using principles of fuzzy logic.

25. The method according to claim 23, further comprising the step of providing a pre-authoring phase.

26. The method according to claim 25, wherein the author analyzes the target audience to generate a database.

27. The method according to claim 26, further comprising the steps of:
generating an audience database and a job/task database;
obtaining correlation results between the job/task database and an audience profile;
generating job/task corrections based on correlation results;
defining training objectives; and
decomposing training objectives into sub-objectives.

28. The method according to claim 27, further comprising the steps of:
dividing sub-objectives into behavioral sub-objectives and cognitive sub-objectives;
obtaining correlation results between behavioral sub-objectives and job/task database;
obtaining correlation results between cognitive sub-objectives and the audience profile; and
generating sub-objective corrections based on correlation results.

* * * * *